(12) United States Patent
Edlund et al.

(10) Patent No.: US 11,103,828 B2
(45) Date of Patent: Aug. 31, 2021

(54) HYDROGEN PURIFICATION DEVICES

(71) Applicant: Element 1 Corp., Bend, OR (US)

(72) Inventors: David J. Edlund, Bend, OR (US); Koji Hoshi, Bend, OR (US); Robert Todd Studebaker, Bend, OR (US); Robert Jacob Studebaker, Bend, OR (US)

(73) Assignee: Element 1 Corp., Bend, OR (US)

( * ) Notice: Subject to any disclaimer, the term of this patent is extended or adjusted under 35 U.S.C. 154(b) by 0 days.

(21) Appl. No.: 16/904,872

(22) Filed: Jun. 18, 2020

(65) Prior Publication Data

US 2020/0316517 A1    Oct. 8, 2020

Related U.S. Application Data

(60) Division of application No. 15/862,474, filed on Jan. 4, 2018, now Pat. No. 10,717,040, which is a
(Continued)

(51) Int. Cl.
*B01D 53/22* (2006.01)
*B01D 71/02* (2006.01)
(Continued)

(52) U.S. Cl.
CPC ......... *B01D 53/228* (2013.01); *B01D 53/226* (2013.01); *B01D 63/082* (2013.01);
(Continued)

(58) Field of Classification Search
CPC ............ C01B 2203/0405; C01B 3/505; B01D 2053/221; B01D 2053/222
See application file for complete search history.

(56) References Cited

U.S. PATENT DOCUMENTS 5,782,960 A * 7/1998 Ogawa .................. B01D 53/22
                                                                95/56
6,183,542 B1 * 2/2001 Bossard ................. B01D 53/22
                                                                55/524
(Continued)

FOREIGN PATENT DOCUMENTS

JP         2009509299 A      3/2009
JP         2010011543 A      5/2010

OTHER PUBLICATIONS

Office Action prepared by the Japanese Patent Office for JP 2020-79526, dated Mar. 15, 2021, 6 pages.

*Primary Examiner* — Matthew J Merkling
(74) *Attorney, Agent, or Firm* — Chernoff Vilhauer LLP

(57) ABSTRACT

Hydrogen purification devices and their components are disclosed. In some embodiments, the devices may include at least one foil-microscreen assembly disposed between and secured to first and second end frames. The at least one foil-microscreen assembly may include at least one hydrogen-selective membrane and at least one microscreen structure including a non-porous planar sheet having a plurality of apertures forming a plurality of fluid passages. The planar sheet may include generally opposed planar surfaces configured to provide support to the permeate side. The plurality of fluid passages may extend between the opposed surfaces. The at least one hydrogen-selective membrane may be metallurgically bonded to the at least one microscreen structure. In some embodiments, the devices may include a permeate frame having at least one membrane support structure that spans at least a substantial portion of an open region and that is configured to support at least one foil-microscreen assembly.

16 Claims, 13 Drawing Sheets

Related U.S. Application Data continuation-in-part of application No. 15/483,265, filed on Apr. 10, 2017, now Pat. No. 10,166,506, which is a continuation of application No. 14/931,585, filed on Nov. 3, 2015, now Pat. No. 9,616,389, which is a division of application No. 13/829,766, filed on Mar. 14, 2013, now Pat. No. 9,187,324, which is a continuation-in-part of application No. 13/600,096, filed on Aug. 30, 2012, now abandoned.

(51) Int. Cl.
| | | |
|---|---|---|
| *C01B 3/50* | (2006.01) | |
| *B23K 20/22* | (2006.01) | |
| *B23K 20/02* | (2006.01) | |
| *B23K 20/16* | (2006.01) | |
| *B01D 63/08* | (2006.01) | |
| *B23K 103/08* | (2006.01) | |

(52) U.S. Cl.
CPC .......... *B01D 71/022* (2013.01); *B23K 20/023* (2013.01); *B23K 20/16* (2013.01); *B23K 20/22* (2013.01); *C01B 3/505* (2013.01); *B01D 2053/221* (2013.01); *B01D 2053/222* (2013.01); *B01D 2256/16* (2013.01); *B01D 2257/502* (2013.01); *B01D 2257/504* (2013.01); *B01D 2257/7022* (2013.01); *B01D 2257/7025* (2013.01); *B01D 2257/80* (2013.01); *B23K 20/026* (2013.01); *B23K 2103/08* (2018.08); *C01B 2203/0233* (2013.01); *C01B 2203/0405* (2013.01); *C01B 2203/0445* (2013.01); *C01B 2203/0827* (2013.01); *C01B 2203/0883* (2013.01); *C01B 2203/1223* (2013.01); *C01B 2203/1288* (2013.01); *C01B 2203/142* (2013.01); *C01B 2203/1619* (2013.01)

(56) References Cited

U.S. PATENT DOCUMENTS

| | | | | |
|---|---|---|---|---|
| 6,537,352 | B2* | 3/2003 | Edlund | B01J 19/2475 96/4 |
| 7,033,641 | B2* | 4/2006 | Saijo | B01D 53/22 427/250 |
| 2003/0033933 | A1* | 2/2003 | Frost | B01D 53/22 95/55 |
| 2008/0210088 | A1* | 9/2008 | Pledger | B01D 63/082 95/56 |
| 2010/0263538 | A1* | 10/2010 | DeVries | B01D 65/003 96/9 |

* cited by examiner

HYDROGEN PURIFICATION DEVICES

CROSS-REFERENCE TO RELATED APPLICATIONS

This application is a divisional application of U.S. patent application Ser. No. 15/862,474, filed Jan. 4, 2018 and entitled "Hydrogen Purification Devices," which is a continuation-in-part application of U.S. patent application Ser. No. 15/483,265, filed Apr. 10, 2017 and now issued as U.S. Pat. No. 10,166,506 and entitled "Hydrogen Generation Assemblies and Hydrogen Purification Devices", which is a continuation of U.S. patent application Ser. No. 14/931,585, filed Nov. 3, 2015 and now issued as U.S. Pat. No. 9,616,389, and entitled "Hydrogen Generation Assemblies and Hydrogen Purification Devices", which is a divisional of U.S. patent application Ser. No. 13/829,766, filed Mar. 14, 2013, and now issued at U.S. Pat. No. 9,187,324, and entitled "Hydrogen Generation Assemblies and Hydrogen Purification Devices", which is a continuation-in-part of U.S. patent application Ser. No. 13/600,096, filed Aug. 30, 2012, and entitled "Hydrogen Generation Assemblies" now abandoned. The complete disclosures of the above applications are hereby incorporated by reference for all purposes.

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; 8,961,627; and U.S. Patent Application Publication Nos. 2006/0090397; 2006/0272212; 2007/0266631; 2007/0274904; 2008/0085434; 2008/0138678; 2008/0230039; and 2010/0064887. The complete disclosures of the above patents and patent application publications are hereby incorporated by reference for all purposes.

SUMMARY OF THE DISCLOSURE

Some embodiments may provide a hydrogen purification device. In some embodiments, the hydrogen purification device may include first and second end frames including an input port configured to receive a mixed gas stream containing hydrogen gas and other gases. The first and second end frames may additionally include an output port configured to receive a permeate stream containing at least one of a greater concentration of hydrogen gas and a lower concentration of the other gases than the mixed gas stream, and a byproduct port configured to receive a byproduct stream containing at least a substantial portion of the other gases. The hydrogen purification device additionally includes at least one foil-microscreen assembly disposed between and secured to the first and second end frames. The at least one foil-microscreen assembly includes at least one hydrogen-selective membrane having a feed side and a permeate side. At least part of the permeate stream is formed from the portion of the mixed gas stream that passes from the feed side to the permeate side, with the remaining portion of the mixed gas stream, which remains on the feed side, forming at least part of the byproduct stream.

The at least one foil-microscreen assembly additionally includes at least one microscreen structure including a non-porous planar sheet having a plurality of apertures forming a plurality of fluid passages. The planar sheet includes generally opposed planar surfaces configured to provide support to the permeate side. The plurality of fluid passages extends between the opposed surfaces. The at least one hydrogen-selective membrane is metallurgically bonded to the at least one microscreen structure. The hydrogen purification device further includes a plurality of frames disposed between the first and second end frames and the at least one foil-microscreen assembly and secured to the first and second end frames. Each frame of the plurality of frames including a perimeter shell defining an open region.

In some embodiments, the hydrogen purification device may include first and second end frames including an input port configured to receive a mixed gas stream containing hydrogen gas and other gases. The first and second end frames may additionally include an output port configured to receive a permeate stream containing at least one of a greater concentration of hydrogen gas and a lower concentration of the other gases than the mixed gas stream, and a byproduct port configured to receive a byproduct stream containing at least a substantial portion of the other gases. The hydrogen purification device additionally includes at least one foil-microscreen assembly disposed between and secured to the first and second end frames. The at least one foil-microscreen assembly includes at least one hydrogen-selective membrane having a feed side and a permeate side. At least part of the permeate stream is formed from the portion of the mixed gas stream that passes from the feed side to the permeate side, with the remaining portion of the mixed gas stream, which remains on the feed side, forming at least part of the byproduct stream. The at least one foil-microscreen assembly additionally includes at least one microscreen structure including generally opposed planar surfaces configured to provide support to the permeate side, and a plurality of fluid passages extending between the opposed surfaces. The at least one hydrogen-selective membrane is metallurgically bonded to the at least one microscreen structure.

The hydrogen purification device further includes a plurality of frames disposed between the first and second end frames and the at least one foil-microscreen assembly and secured to the first and second end frames. The plurality of frames includes at least one permeate frame disposed between the at least one foil-microscreen assembly and the second end frame. The at least one permeate frame includes a perimeter shell and an output conduit formed on the perimeter shell and configured to receive the at least part of the permeate stream from the at least one hydrogen-selective membrane. The at least one permeate frame additionally includes an open region surrounded by the perimeter shell, and at least one membrane support structure that spans at least a substantial portion of the open region and that is configured to support the at least one foil-microscreen assembly. The at least one membrane support structure is free from perforations.

Some embodiments may provide a foil-microscreen assembly. The foil-microscreen assembly may include at least one hydrogen-selective membrane having a feed side and a permeate side. The at least one hydrogen-selective membrane may be configured to receive a mixed gas stream, to form a permeate stream from the portion of the mixed gas stream that passes from the feed side to the permeate side, and to form a byproduct stream from the remaining portion of the mixed gas stream that remains on the feed side. The foil-microscreen assembly additionally may include at least one microscreen structure including a non-porous planar sheet having a plurality of apertures forming a plurality of fluid passages. The planar sheet may include generally opposed planar surfaces configured to provide support to the permeate side. The plurality of fluid passages may extend between the opposed surfaces. The permeate side of the at least one hydrogen-selective membrane may be metallurgically bonded to the at least one microscreen structure.

DETAILED DESCRIPTION OF THE DISCLOSURE

Figure 1:
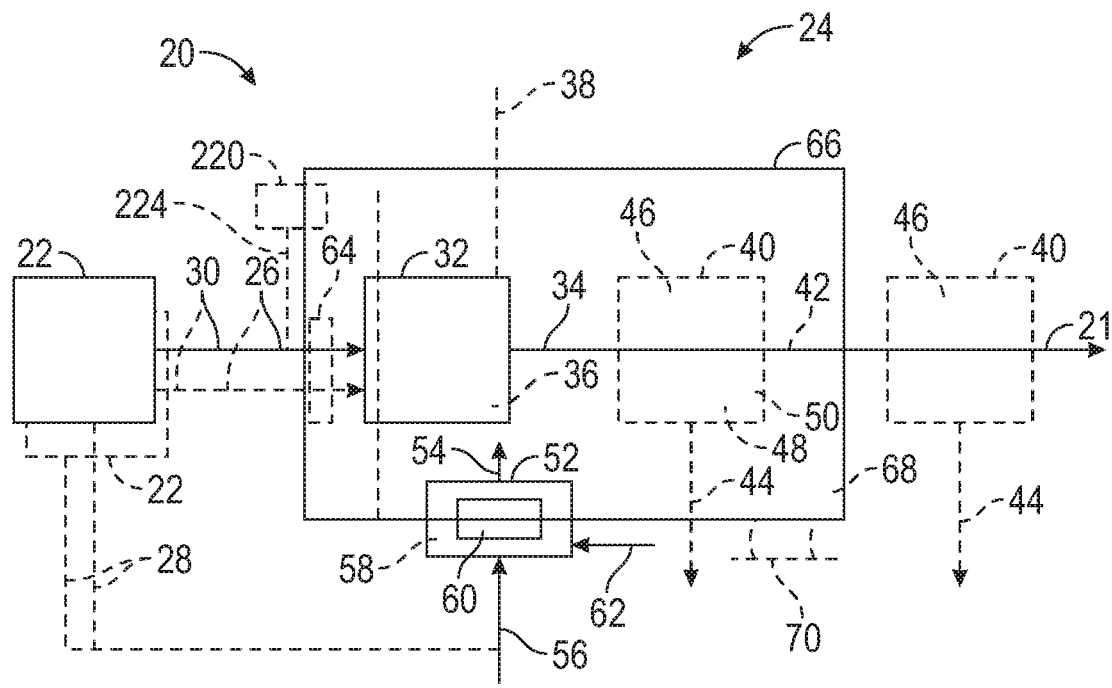
FIG. 1 is a schematic view of an example of a hydrogen generation assembly.

FIG. 1 shows an example of a hydrogen generation assembly 20. Unless specifically excluded hydrogen generation assembly 20 may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when the fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both streams may be liquid streams, while in other embodiments both streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the deliver of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 volume % hydrogen gas, 15-25 volume % hydrogen gas, 20-30 volume % hydrogen gas, at least 10 or 15 volume % hydrogen gas, at least 20 volume % hydrogen gas, etc.

Purification region 40 may include any suitable structure configured to enrich (and/or increase) the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or different mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Three other especially effective alloys are palladium with 2 weight % to 20 weight % gold, especially palladium with 5 weight % gold; palladium with 3 weight % to 10 weight % indium plus 0 weight % to 10 weight % ruthenium, especially palladium with 6 weight % indium plus 0.5 weight % ruthenium; and palladium with 20 weight % to 30 weight % silver. When palladium and palladium alloys are used, hydrogen-selective membranes 46 may sometimes be referred to as "foils." Typical thickness of hydrogen-permeable metal foils is less than 25 microns (micrometers), preferably less than or equal to 15 microns, and most preferably between 5 and 12 microns. The foils may be any suitable dimensions, such as 110 mm by 270 mm.

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221,117, the complete disclosures of which are hereby incorporated by reference for all purposes.

Figure 2:
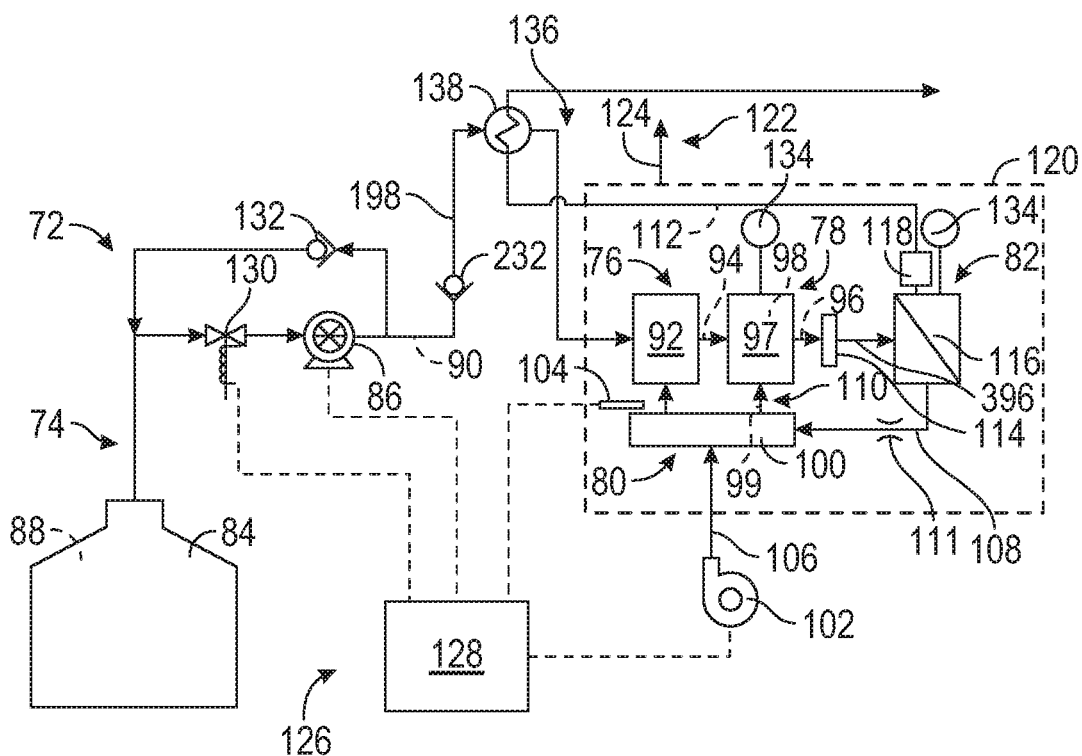
FIG. 2 is a schematic view of another example of a hydrogen generation assembly.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one or more feed streams, such as vapor feed stream(s) 94 from the vaporization region, to produce one or more output streams 96 containing hydrogen gas as a majority component and other gases. The hydrogen-producing region may produce the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116.

The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control system 126, which may include any suitable structure configured to control operation of hydrogen generation assembly 72. For example, control assembly 126 may include a control assembly 128, at least one valve 130, at least one pressure relief valve 132, and one or more temperature measurement devices 134. Control assembly 128 may detect temperatures in the hydrogen-producing region and/or purification regions via the temperature measurement device 134, which may include one or more thermocouples and/or other suitable devices. Based on the detected temperatures, the control assembly and/or an operator of the control system may adjust delivery of feed stream 90 to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Figure 3:
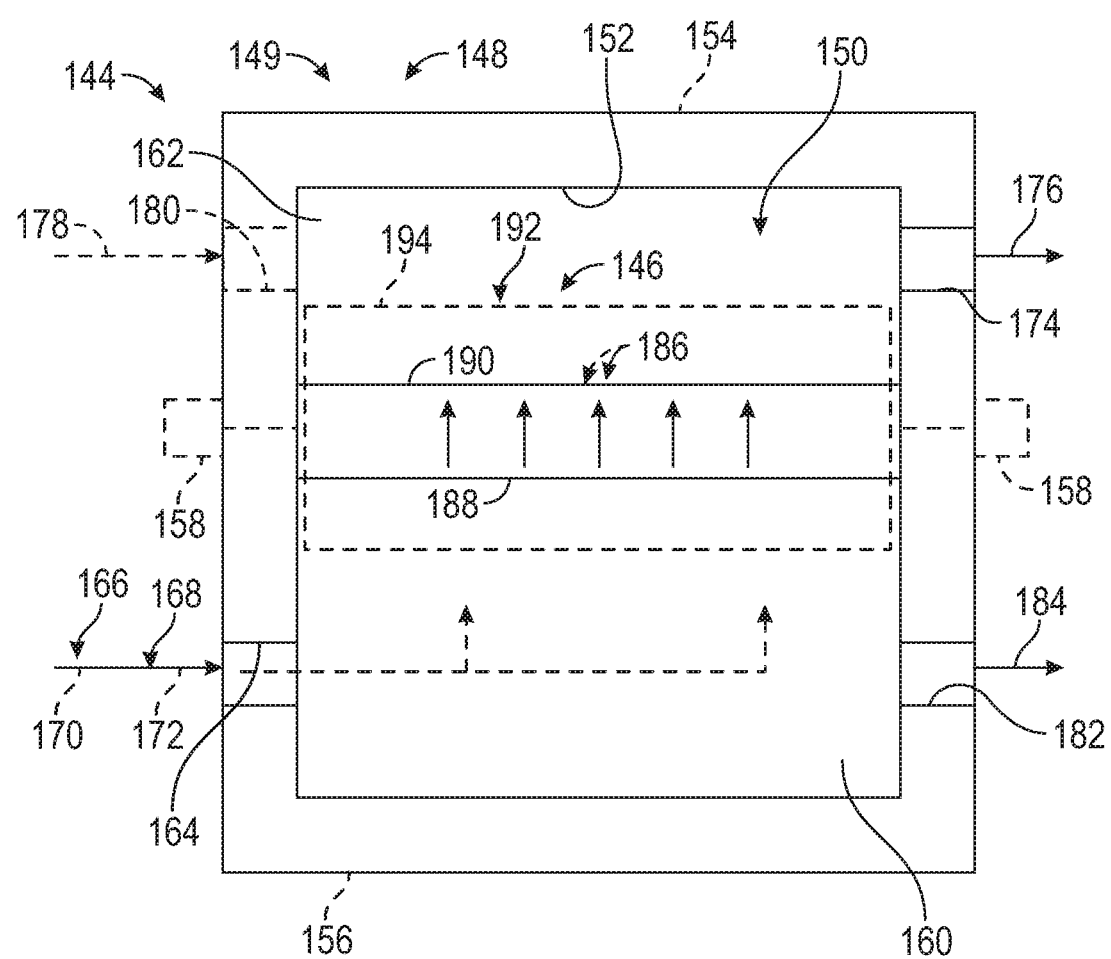
FIG. 3 is a schematic view of a hydrogen purification device of the hydrogen generation assembly of FIG. 1.

An example of a purification region 40 (or hydrogen purification device) of hydrogen generation assembly 20 of FIG. 1 is generally indicated at 144 in FIG. 3. Unless specifically excluded, the hydrogen purification device may include one or more components of the other purification regions described in this disclosure. Hydrogen purification device 40 may include a hydrogen-separation region 146 and an enclosure 148. The enclosure may define an internal volume 150 having an internal perimeter 152. Enclosure 148 may include at least a first portion 154 and a second portion 156 coupled together to form a body 149 in the form of a sealed pressure vessel that may include defined input and output ports. Those ports may define fluid paths by which gases and other fluids are delivered into and removed from the enclosure's internal volume.

First and second portions 154 and 156 may be coupled together using any suitable retention mechanism or structure 158. Examples of suitable retention structures include welds and/or bolts. Examples of seals that may be used to provide a fluid-tight interface between the first and second portions may include gaskets and/or welds. Additionally, or alternatively, first and second portions 154 and 156 may be secured together so that at least a predetermined amount of compression is applied to various components that define the hydrogen-separation region within the enclosure and/or other components that may be incorporated into a hydrogen generation assembly. The applied compression may ensure that various components are maintained in appropriate positions within the enclosure. Additionally, or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 148 may include a mixed gas region 160 and a permeate region 162, as shown in FIG. 3. The mixed gas and permeate region may be separated by hydrogen-separation region 146. At least one input port 164 may be provided, through which a fluid stream 166 is delivered to the enclosure. Fluid stream 166 may be a mixed gas stream 168 that contains hydrogen gas 170 and other gases 172 that are delivered to mixed gas region 160. Hydrogen gas may be a majority component of the mixed gas stream. Hydrogen-separation region 146 may extend between mixed gas region 160 and permeate region 162 so that gas in the mixed gas region must pass through the hydrogen-separation region in order to enter the permeate region. The gas may, for example, be required to pass through at least one hydrogen-selective membrane as discussed further below. The permeate and mixed gas regions may be of any suitable relative size within the enclosure.

Enclosure 148 also may include at least one product output port 174 through which a permeate stream 176 may be received and removed from permeate region 162. The permeate stream may contain at least one of a greater concentration of hydrogen gas and a lower concentration of other gases than the mixed gas stream. Permeate stream 176 may, in some embodiments, include at least initially a carrier, or sweep, gas component, such as may be delivered as a sweep gas stream 178 through a sweep gas port 180 that is in fluid communication with the permeate region. The enclosure also may include at least one byproduct output port 182 through which a byproduct stream 184 containing at least one of a substantial portion of other gases 172 and a reduced concentration of hydrogen gas 170 (relative to the mixed gas stream) is removed from the mixed gas region.

Hydrogen-separation region 146 may include at least one hydrogen-selective membrane 186 having a first or mixed gas surface 188, which is oriented for contact by mixed gas stream 168, and a second or permeate surface 190, which is generally opposed to surface 188. Mixed gas stream 168 may be delivered to the mixed gas region of the enclosure so that it comes into contact with the mixed gas surface of the one or more hydrogen-selective membranes. Permeate stream 176 may be formed from at least a portion of the mixed gas stream that passes through the hydrogen-separation region to permeate region 162. Byproduct stream 184 may be formed from at least a portion of the mixed gas stream that does not pass through the hydrogen-separation region. In some embodiments, byproduct stream 184 may contain a portion of the hydrogen gas present in the mixed gas stream. The hydrogen-separation region also may be configured to trap or otherwise retain at least a portion of the other gases, which may then be removed as a byproduct stream as the separation region is replaced, regenerated, or otherwise recharged.

In FIG. 3, streams 166, 176, 178, and/or 184 may include more than one actual stream flowing into or out of hydrogen purification device 144. For example, the hydrogen purification device may receive a plurality of mixed gas streams 168, a single mixed gas stream 168 that is divided into two or more streams prior to contacting hydrogen-separation region 146, a single stream that is delivered into internal volume 150, etc. Thus, enclosure 148 may include more than one input port 164, product output port 174, sweep gas port 180, and/or byproduct output port 182.

The hydrogen-selective membranes may be formed of any hydrogen-permeable material suitable for use in the operating environment and parameters in which the hydrogen purification device is operated. Examples of hydrogen purification devices are disclosed in U.S. Pat. Nos. 5,997,594 and 6,537,352, the complete disclosures of which are hereby incorporated by reference for all purposes. In some embodiments, the hydrogen-selective membranes may be formed from at least one of palladium and a palladium alloy. Examples of palladium alloys include alloys of palladium with copper, silver, and/or gold. Examples of various membranes, membrane configuration, and methods for preparing membranes and membrane configurations are disclosed in U.S. Pat. Nos. 6,152,995; 6,221,117; 6,319,306; and 6,537,352, the complete disclosures of which are hereby incorporated by reference for all purposes.

In some embodiments, a plurality of spaced-apart hydrogen-selective membranes 186 may be used in a hydrogen-separation region to form at least a portion of a hydrogen-separation assembly 192. When present, the plurality of membranes may collectively define one or more membrane assemblies 194. In such embodiments, the hydrogen-separation assembly may generally extend from first portion 154 to second portion 156. Thus, the first and second portions may effectively compress the hydrogen-separation assembly. In some embodiments, enclosure 148 may additionally, or alternatively, include end plates (or end frames) coupled to opposite sides of a body portion. In such embodiments, the end plates may effectively compress the hydrogen-separation assembly (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surface of the membranes at a higher pressure than the gases in the permeate region of the hydrogen-separation region. The hydrogen-separation region may, in some embodiments, be heated via any suitable mechanism to an elevated temperature when the hydrogen-separation region is utilized to separate the mixed gas stream into the permeate and byproduct streams. Examples of suitable operating temperatures for hydrogen purification using palladium and palladium alloy membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., etc.

Figure 4:
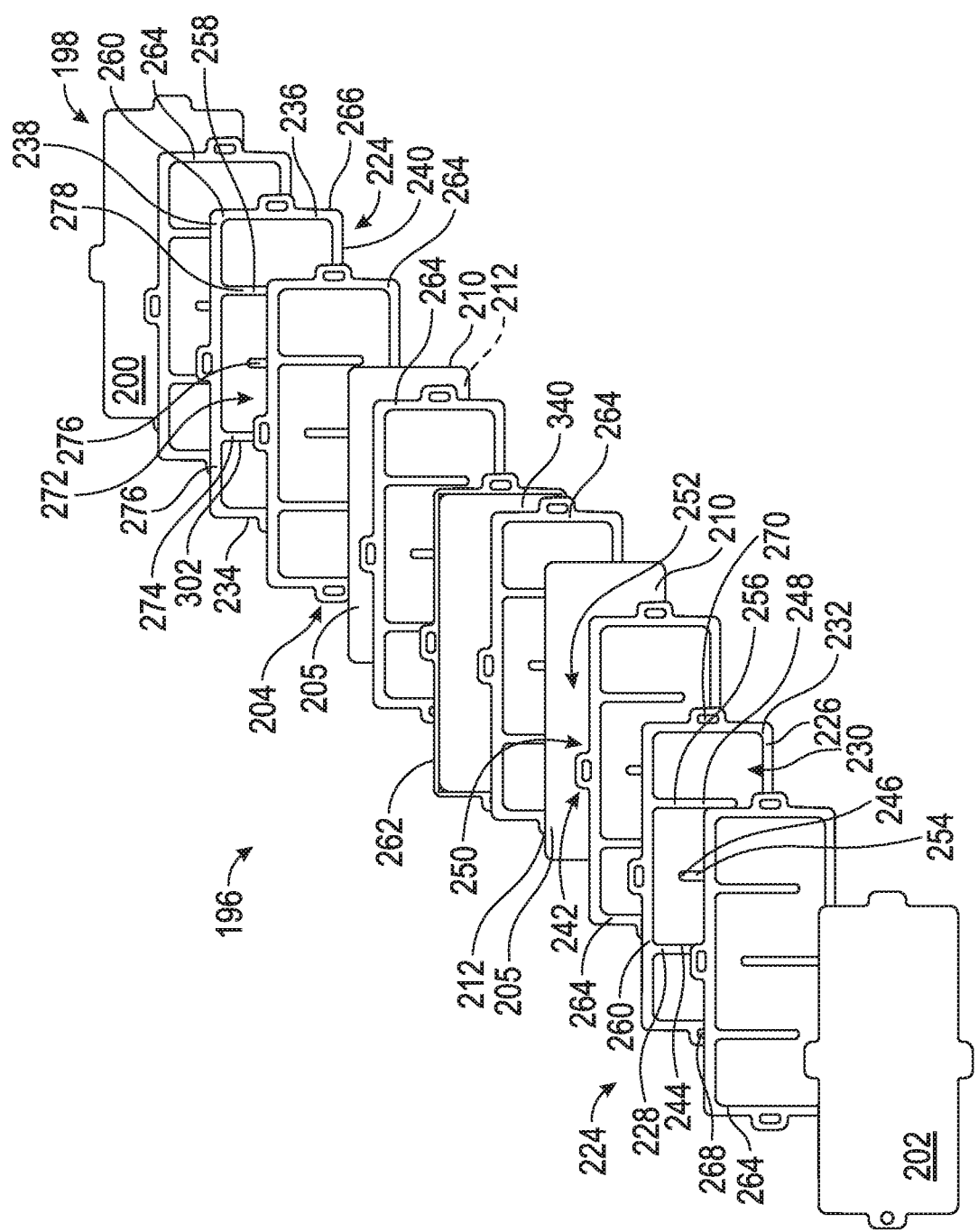
FIG. 4 is an exploded isometric view of an example of the hydrogen purification device of FIG. 3.

An example of hydrogen purification device 144 is generally indicated at 196 in FIG. 4. Unless specifically excluded, hydrogen purification device 196 may include one or more components of other hydrogen purification devices and/or purification regions described in this disclosure. Hydrogen purification device 196 may include a shell or enclosure 198, which may include a first end plate or end frame 200 and a second end plate or end frame 202. The first and second end plates may be configured to be secured and/or compressed together to define a sealed pressure vessel having an interior compartment 204 in which the hydrogen-separation region is supported. The first and second end plates may include input, output, sweep gas, and byproduct ports (not shown) similar to hydrogen purification device 144.

Figure 5:
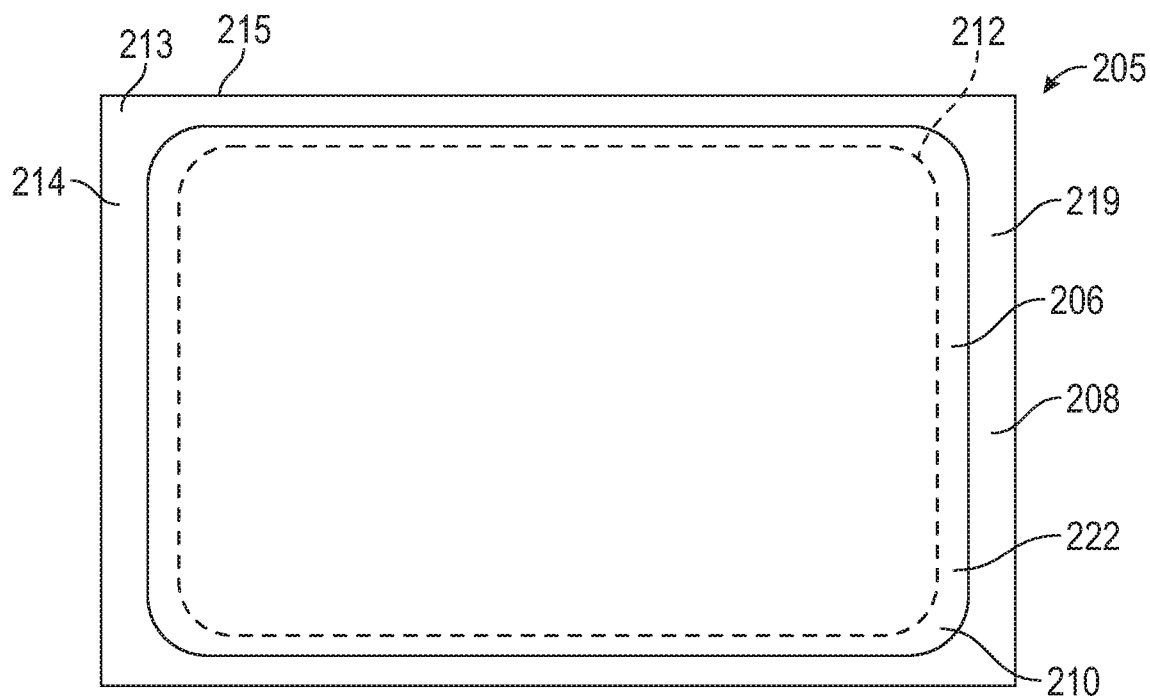
FIG. 5 is a top view of an example of a foil-microscreen assembly of the hydrogen purification device of FIG. 4.

Hydrogen purification device 196 also may include at least one foil-microscreen assembly 205, which may be disposed between and/or secured to the first and second end plates. The foil-microscreen assembly may include at least one hydrogen-selective membrane 206 and at least one microscreen structure 208, as shown in FIG. 5. The hydrogen-selective membrane may be configured to receive at least part of the mixed gas stream from the input port and to separate the mixed gas stream into at least part of the permeate stream and at least part of the byproduct stream. Hydrogen-selective membrane 206 may include a feed side 210 and a permeate side 212. At least part of the permeate stream being formed from the portion of the mixed gas stream that passes from the feed side to the permeate side, with the remaining portion of the mixed gas stream, which remains on the feed side, forming at least part of the byproduct stream.

One or more of the hydrogen-selective membranes may be metallurgically bonded to microscreen structure 208. For example, the permeate side of the hydrogen-selective membrane(s) may be metallurgically bonded to the microscreen structure. In some embodiments, one or more of hydrogen-selective membranes 206 (and/or the permeate side of those membrane(s)) may be diffusion bonded to the microscreen structure to form a solid-state diffusion bond between the membrane(s) and the microscreen structure. For example, the permeate side of the membrane(s) and the microscreen structure may be brought in contact with each other and exposed to elevated temperature and/or elevated pressure to allow the surfaces of the membrane(s) and the microscreen structure to intersperse themselves over time.

In some embodiments, the microscreen structure may be coated with a thin layer of a metal or intermediate bonding layer that aids in the diffusion bonding. For example, a thin coating of nickel, copper, silver, gold, or other metal that is amenable to solid-state diffusion bonding but does not (1) melt and enter the liquid phase at less than or equal to 700° C. and (2) form a low-melting alloy at less than or equal to 700° C. upon diffusion into the hydrogen-selective membrane(s). The thin metal layer may be applied to the microscreen structure via a suitable deposition process (e.g., electrochemical plating, vapor deposition, sputtering, etc.) of a thin coating of the intermediate bonding layer onto the surface of the microscreen structure that will be in contact with the hydrogen-selective membrane. In other embodiments, the hydrogen-selective membrane(s) may be secured to at least one membrane frame (not shown), which may then be secured to the first and second end frames.

Figure 6:
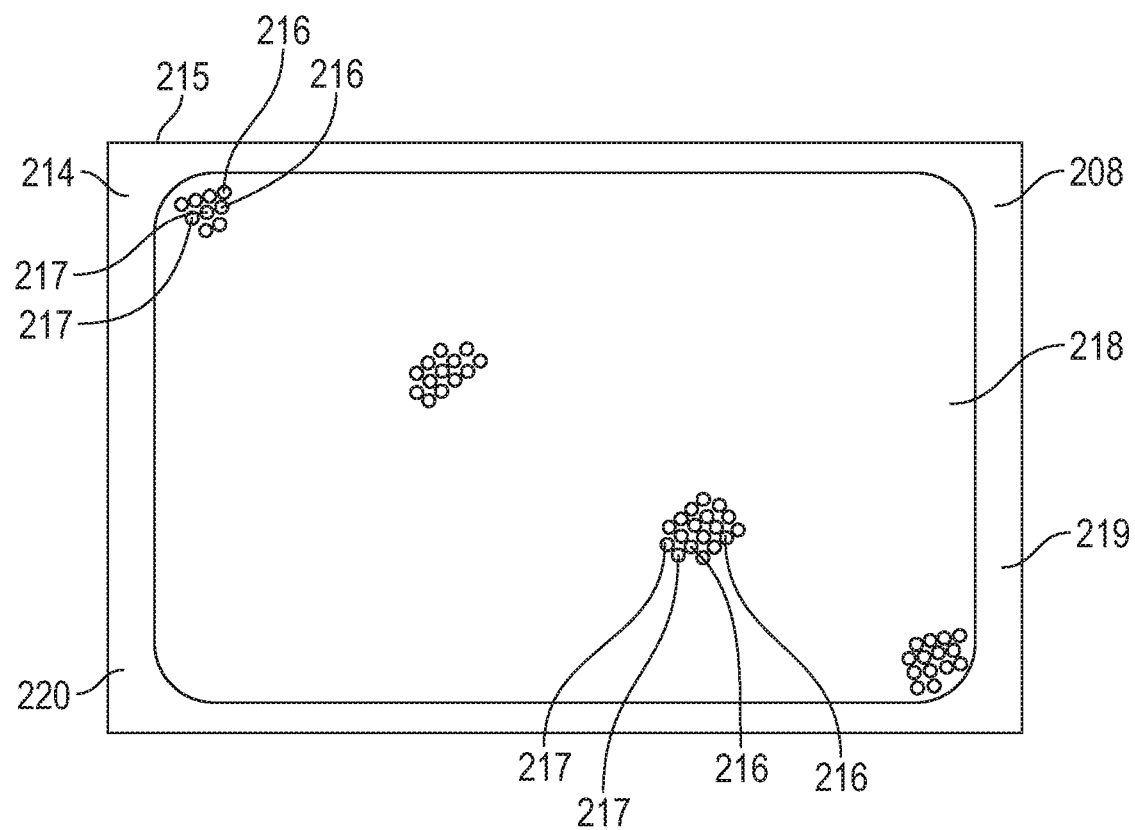
FIG. 6 is a top view of an example of a microscreen structure of the foil-microscreen assembly of FIG. 5.

Microscreen structure 208 may include any suitable structure configured to support the at least one hydrogen-selective membrane. For example, the microscreen structure may include a non-porous planar sheet 213 having generally opposed surfaces 214 and 215 configured to provide support to permeate side 212, and a plurality of apertures 216 that forms a plurality of fluid passages 217 extending between the opposed surfaces which allows the permeate stream to flow through the microscreen structure, as shown in FIG. 6. The apertures may be formed on the non-porous planar sheet via electrochemical etching, laser drilling, and other mechanical forming processes, such as stamping or die cutting. In some embodiments, one or more of the apertures (or all of the apertures) may be formed on the non-porous planar sheet such that their (longitudinal) axis, or the longitudinal axes of the fluid passages, are perpendicular to the plane of the non-porous planar sheet, as shown in FIG. 6. The non-porous planar sheet may be any suitable thickness, such as between 100 microns and about 200 microns.

In some embodiments, microscreen structure 208 may include one or more perforated areas (or portions) 218 that include the plurality of apertures and one or more non-perforated areas (or portions) 219 that do not include (or exclude) the plurality of apertures. Although only a few apertures 216 are illustrated in FIG. 6, apertures 216 are distributed across the entire length and width of only the perforated portion(s). The perforated area(s) may be discrete or spaced from one or more other perforated areas. Non-perforated area(s) 219 may include a perimeter area (or portion) 220 that forms a frame around one or more of the perforated area(s), and/or one or more border areas (or portions) 221 that separate or define two more discrete portions of perforated areas. In other words, each perforated portion may be spaced from other adjacent discrete perforated portions by at least one border portion that is free from the plurality of apertures.

Figure 7:
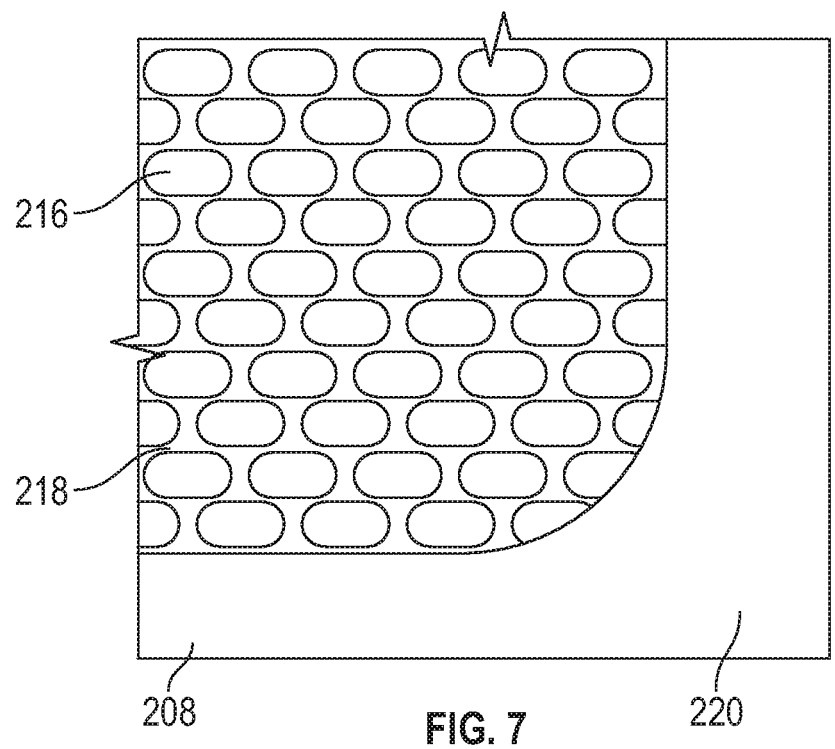
FIG. 7 is a partial view of the microscreen structure of FIG. 6 with another example of apertures.
Figure 8:
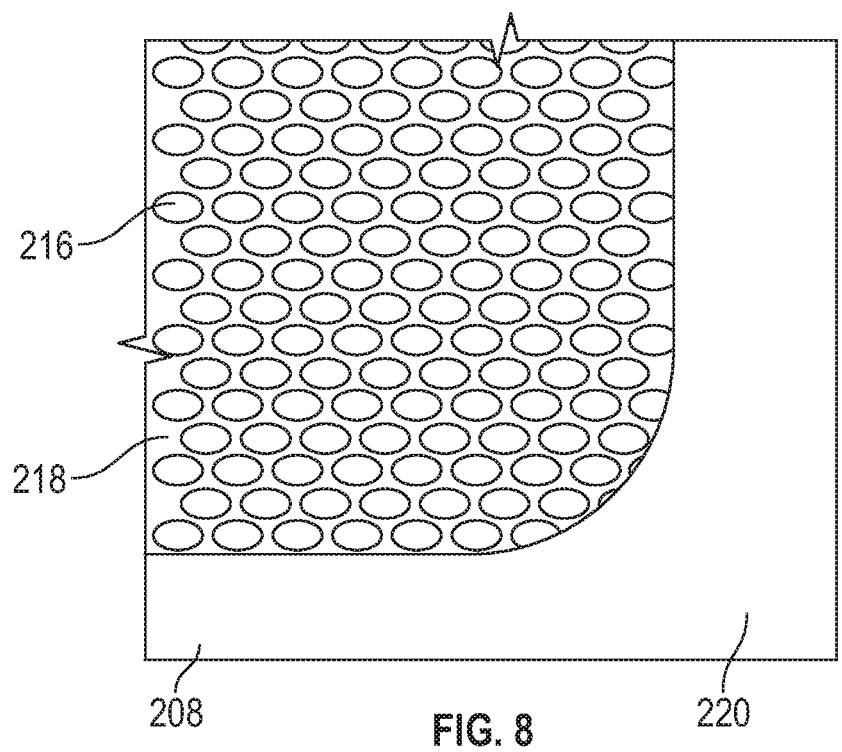
FIG. 8 is a partial view of the microscreen structure of FIG. 6 with yet another example of apertures.
Figure 9:
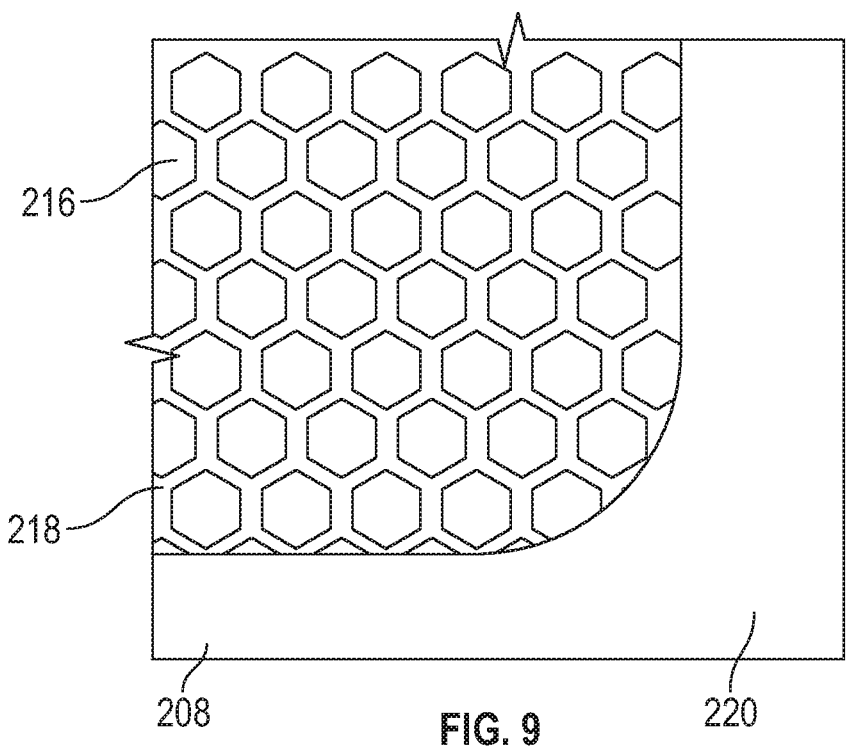
FIG. 9 is a partial view of the microscreen structure of FIG. 6 with a further example of apertures.

Apertures 216 may include any suitable pattern(s), shape(s), and/or size(s). In some embodiments, the apertures may be formed with one or more patterns that maximizes combined aperture area while maintaining a high enough stiffness of the microscreen structure to prevent excessive deflection under a pressure load. Apertures 216 may be circles (circular) as shown in FIG. 6, elongated circles as shown in FIG. 7, ovals as shown in FIG. 8, hexagons as shown in FIG. 9, triangular, square, rectangular, octagons, and/or other suitable shape(s). In some embodiments, apertures 216 in the perforated area(s) may be a single consistent shape. In other embodiments, apertures 216 in the perforated area(s) may be any suitable combination of two or more different shapes. The apertures may be any suitable size(s). For example, when the apertures are circles, the diameters may range from about 0.003 inches to about 0.020 inches. Additionally, when the apertures are oval, the radius of the rounded ends of the oval may range from 0.001 inches to about 0.010 inches and the length of the oval may be up to ten times the radius. In some embodiments, the apertures in the perforated area(s) may be a single consistent size. In other embodiments, apertures 216 in the perforated area(s) may be any suitable combination of two or more different sizes.

The non-porous planar sheet may include any suitable materials. For example, the non-porous planar sheet may include stainless steel. The stainless steel may include 300-series stainless steel (e.g., stainless steel 303 (aluminum modified), stainless steel 304, etc.), 400-series stainless steel, 17-7PH, 14-8 PH, and/or 15-7 PH. In some embodiments, the stainless steel may include about 0.6 weight % to about 3.0 weight % of aluminum. In some embodiments, the non-porous planar sheet may include carbon steel, copper or copper alloys, aluminum or aluminum alloys, nickel, nickel-copper alloys, and/or base metals plated with silver, nickel, and/or copper. The base metals may include carbon steel or one or more of the stainless steel discussed above.

Figure 10:
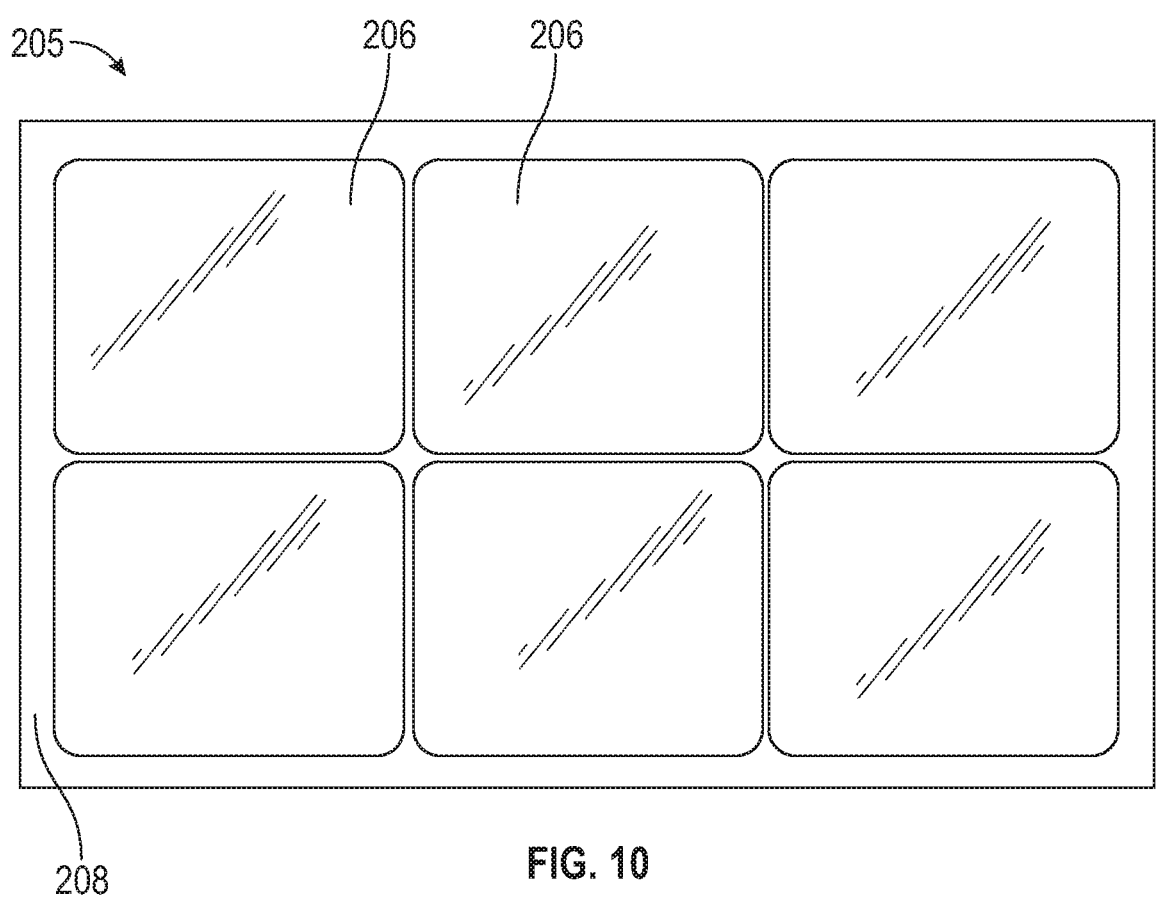
FIG. 10 is a top view of another example of a foil-microscreen assembly of the hydrogen purification device of FIG. 4.
Figure 12:
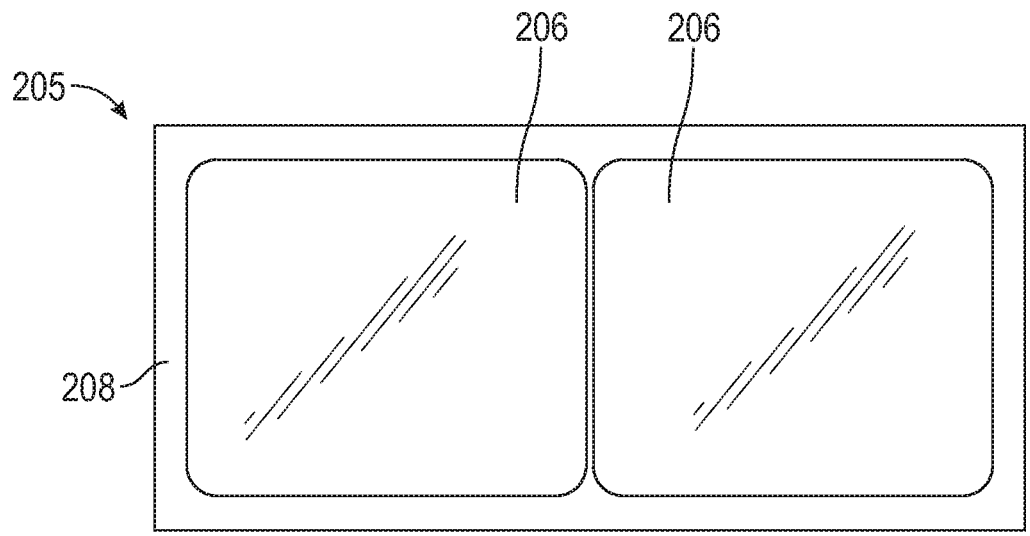
FIG. 12 is a top view of another example of a foil-microscreen assembly of the hydrogen purification device of FIG. 4.
Figure 13:
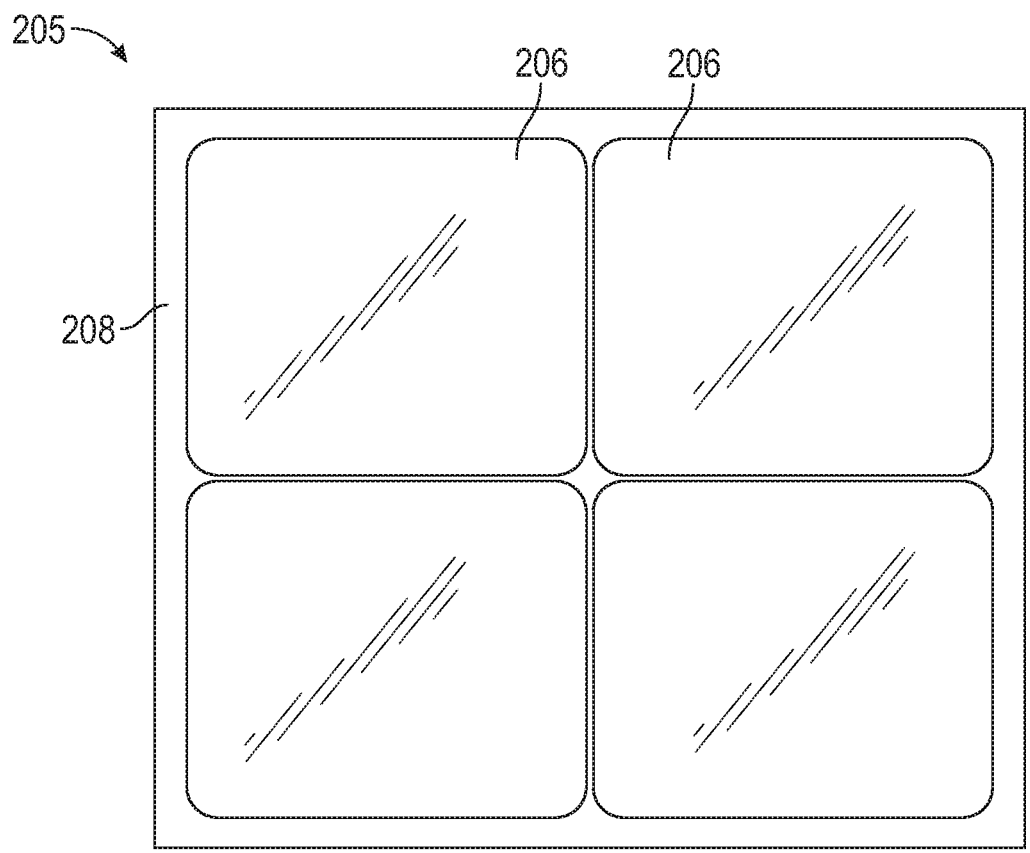
FIG. 13 is a top view of a further example of a foil-microscreen assembly of the hydrogen purification device of FIG. 4.

Hydrogen-selective membrane 206 may be sized larger than the perforated area or field of the microscreen structure such that a perimeter portion 222 of the hydrogen-selective membrane contacts one or more non-perforated areas 219 of the microscreen structure when the hydrogen-selective membrane is metallurgically bonded to the microscreen structure. In some embodiments, a single hydrogen-selective membrane may be metallurgically bonded to a single microscreen structure, as shown in FIG. 5. In other embodiments, two or more hydrogen-selective membranes 206 may be metallurgically bonded to a single microscreen structure 208. For example, two, three, four, five, six, seven, eight, nine, ten or more hydrogen-selective membranes 206 may be metallurgically bonded to a single microscreen structure 208. FIG. 10 shows an example foil-microscreen assembly 205 having six hydrogen-selective membranes 206 metallurgically bonded to a single microscreen structure 208. FIG. 12 shows an example foil-microscreen assembly 205 having two hydrogen-selective membranes 206 metallurgically bonded to a single microscreen structure 208, while FIG. 13 shows an example foil-microscreen assembly 205 having four hydrogen-selective membranes 206 metallurgically bonded to a single microscreen structure 208.

Figure 11:
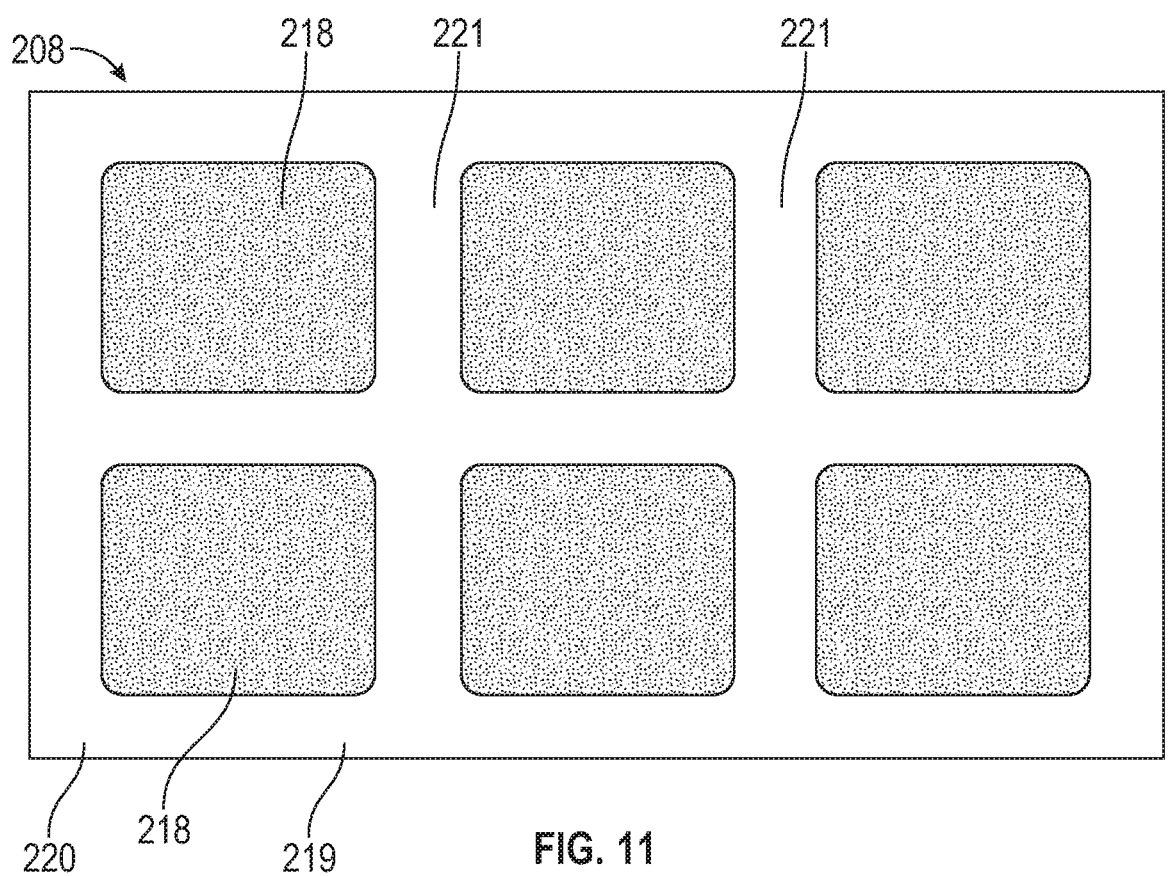
FIG. 11 is a top view of an example of a microscreen structure of the foil-microscreen assembly of FIG. 10.

When two or more hydrogen-selective membranes 206 are metallurgically bonded to the microscreen structure, the microscreen structure may include two or more discrete perforated areas 218 separated by one or more non-perforated areas 219. In some embodiments, a perforated area 218 may be sized the same as the other perforated areas 218. For example, FIG. 11 shows six discrete perforated areas 218 that are about the same size. In other embodiments, one or more perforated areas 218 may be sized smaller and/or larger than other perforated areas 218. A hydrogen-selective membrane 206 may be metallurgically bonded to each of the perforated areas, as shown in FIG. 10. Alternatively, or additionally, a hydrogen-selective membrane may be metallurgically bonded to two or more discrete perforated areas 218. Hydrogen-selective membrane(s) 206 may be sized such that perimeter portion 222 of the membranes contacts one or more non-perforated areas 219 when the membranes metallurgically bonded to one or more perforated areas 218.

Microscreen structure 208 may be sized to be contained (such as entirely contained) within the open region of the permeate frame and/or supported by the membrane support structure within that open region, as shown in FIG. 5. In other words, the microscreen structure may be sized not to contact the perimeter shell of the permeate frame when the microscreen structure and the permeate frame are secured or compressed to the first and second end frames. Alternatively, the microscreen structure may be supported by and/or secured to a non-porous perimeter wall portion or frame (not shown), such as to the perimeter shell of the permeate frame. When the microscreen structure is secured to a non-porous perimeter wall portion, the microscreen structure may be referred to as a "porous central area portion." Examples of other microscreen structures are disclosed in U.S. Patent Application Publication No. 2010/0064887, the complete disclosure of which is hereby incorporated by reference for all purposes.

Hydrogen purification device 196 also may include a plurality of plates or frames 224 disposed between and secured to the first and/or second end frames. The frames may include any suitable structure and/or may be any suitable shape(s), such as square, rectangular, or circular. For example, frames 224 may include a perimeter shell 226 and at least a first support member 228, as shown in FIG. 4. The perimeter shell may define an open region 230 and a frame plane 232. Additionally, perimeter shell 226 may include first and second opposed sides 234 and 236, and third and fourth opposed sides 238 and 240, as shown in FIG. 4.

First support member 228 may include any suitable structure configured to support a first portion 242 of foil-microscreen assembly 205, as shown in FIG. 4. For example, the first support members of the plurality of frames may be co-planar with each other (or with other first support members of other frames of the plurality of frames) within a first support plane 244 to support first portion 242 of the hydrogen-selective membrane, as shown in FIG. 4. In other words, the first support member of each frame of the plurality of frames may mirror the first support member of the other frames of the plurality of frames. The first support member may have any suitable orientation to frame plane 232. For example, first support plane 244 may be perpendicular to the frame plane, as shown in FIG. 4. Alternatively, the first membrane support plane may intersect but not be perpendicular to frame plane 232.

In some embodiments, frames 224 may include a second support member 246 and/or third support member 248, which may include any suitable structure configured to support a second portion 250 and/or a third portion 252 of foil-microscreen assembly 205, as shown in FIG. 4. For example, the second support members of the plurality of frames may be co-planar with each other (or with other second support members of the plurality of frames) within a second support plane 254 to support second portion 250 of the foil-microscreen assembly. Additionally, the third support members of the plurality of frames may be co-planar with each other (or with other third support members of the plurality of frames) within a third support plane 256 to support third portion 252 of the foil-microscreen assembly. In other words, the second support member of each frame of the plurality of frames may mirror the second support member of the other frames of the plurality of frames, while the third support member of each frame of the plurality of frames may mirror the third support member of the other frames of the plurality of frames. The second and/or third support planes may have any suitable orientation to frame plane 232. For example, second support plane 254 and/or third support plane 256 may be perpendicular to the frame plane, as shown in FIG. 4. Alternatively, the second and/or third support planes may intersect but not be perpendicular to frame plane 232.

Second support member 246 and/or third support member 248 may have any suitable orientation to first support member 228. For example, first support member 228 may extend into open region 230 from third side 238 of perimeter shell 226; second support member 246 may extend into the open region from fourth side 240 (which is opposed from the third side) of the perimeter shell; and third support member 248 may extend into the open region from the third side. Alternatively, the first, second, and/or third support members may extend into the open region from the same side, such as from the first, second, third, or fourth sides of the perimeter shell. In some embodiments, the first, second, and/or third support members may extend into the open region from the first side and/or second side (which is opposed from the first side) of the perimeter shell.

The first, second, and/or third support members may, for example, be in the form of one or more projections or fingers 258 attached to the perimeter shell and/or formed with the perimeter shell. The projections may extend from the perimeter shell in any suitable direction(s). The projections may be the full thickness of the perimeter shell or may be less than the full thickness of that shell. The projections of each frame of frames 224 may be compressed against the foil-microscreen assembly thereby locking that assembly in place. In other words, the projections of frames 224 may support the foil-microscreen assembly by being stacked extension(s) of the end frames within the first and/or second membrane support plane. In some embodiments, projection(s) 258 may include one or more receptacles or apertures (not shown) configured to receive at least one fastener (not shown) to secure frames 224 to the first and/or second end frames.

Frames 224 may include at least one feed frame 260, at least one permeate frame 262, and a plurality of gaskets or gasket frames 264, as shown in FIG. 4. Feed frame 260 may be disposed between one of the first and second end frames and at least one foil-microscreen assembly 205, or between two foil-microscreen assemblies 205. The feed frame may include a feed frame perimeter shell 266, a feed frame input conduit 268, a feed frame output conduit 270, a feed frame open region 272, at least a first feed frame support member 274, as shown in FIG. 4. In some embodiments, the feed frame may include a second feed frame support member 276 and/or a third feed frame support member 278.

Figure 14:
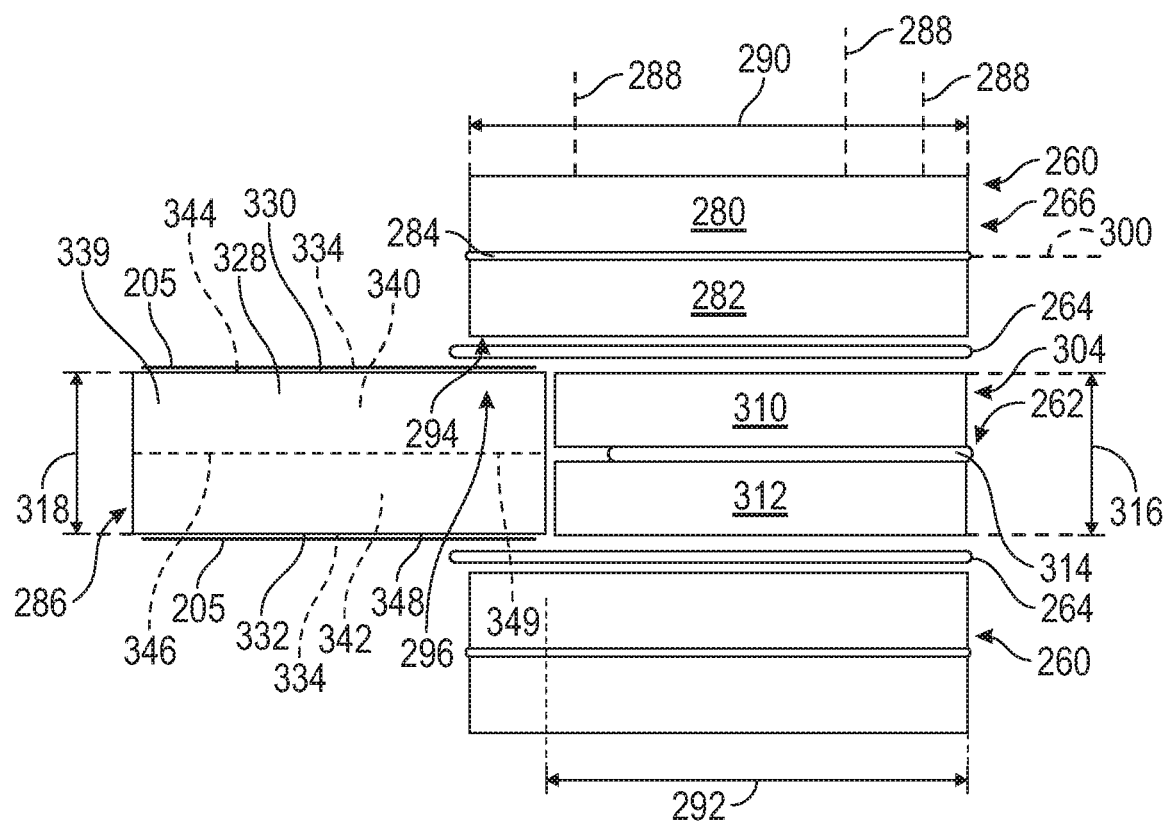
FIG. 14 is a partial sectional view of an example of a permeate frame, foil-microscreen assemblies, gasket frames, and feed frames of the hydrogen purification device of FIG. 4, shown without gasket frames between the foil-microscreen assemblies and the permeate frame.

Feed frame perimeter shell 266 may include any suitable structure. For example, the feed frame perimeter shell may include a first section or first perimeter shell 280 and a second section or second perimeter shell 282, as shown in FIG. 14. Please note that the components of FIG. 14 have been exaggerated for illustration purposes and may not reflect the relative dimensions of those components. The first and second sections may be first and second halves of the perimeter shell, or may be any suitable portions of that perimeter shell. Additionally, the first and/or second sections may include channels or grooves (not shown) in any suitable relationship with each other, such as offset from each other. First section 280 and second section 282 may be joined via any suitable method(s) to form a gas-tight seal between those sections. For example, a feed frame gasket 284 may be used between those sections. Alternatively, the first and second sections may be brazed together or layering metal(s) may be used to join the first and second sections as described in U.S. Patent Application Publication No. 2013/0011301. The complete disclosure of which is hereby incorporated by reference for all purposes.

Additionally, feed frame perimeter shell 266 may include any suitable dimensions configured to support other components of hydrogen purification device 196. For example, the feed frame perimeter shell may be sized such that it supports the perimeter shell of permeate frame(s) 262 and membrane support structure(s) 286 of those frame(s) along a plurality of feed frame support planes 288. For example, perimeter shell 266 may have a width 290 that is larger than a width 292 of the perimeter shell of permeate frame 262 such that at least a portion 294 of the perimeter shell supports a portion 296 of membrane support structure 286, as shown in FIG. 14. In other words, feed frame perimeter shell may lock membrane support structure in place and serve as a stop for that support structure. The feed frame support planes may have any suitable orientation to a feed frame plane 300. For example, the feed frame support planes may be perpendicular to the feed frame plane, as shown in FIG. 14. Alternatively, the feed frame support planes may intersect but not be perpendicular to feed frame plane 300.

The feed frame input conduit may be formed on the feed frame perimeter shell and/or be configured to receive at least part of the mixed gas stream from the input port. Feed frame output conduit 270 may be formed on the feed frame perimeter shell and/or be configured to receive the remaining portion of the mixed gas stream that remains on feed side 210 of hydrogen-selective membrane 206. Feed frame open region 272 may be disposed between the feed frame input and output conduits. Feed frame perimeter shell 266 may include a plurality of grooves or channels (not shown) fluidly connecting the input and output conduits with the feed frame open region. The channels may be formed on the perimeter shell via any suitable method(s) and/or may have any suitable orientation(s), such as angled orientations which may induce mixing in feed frame open region 260.

The first, second, and/or third feed frame support members may include any suitable structure configured to support the first, second, and/or third portions of at least one hydrogen-selective membrane and/or may mirror the first, second, and/or third support members of other frames, as discussed above. Additionally, the first, second, and/or third feed frame support members may include any suitable structure configured to change direction of flow of at least part of the mixed gas stream as it flows across the feed frame open region between the input and output conduits. The first and/or second feed frame support members also may be configured to promote turbulence or mixing within the feed frame open region. For example, without the first and/or second feed frame support members, flow of at least part of the mixed gas stream across the feed frame open region between the input and output conduits may move in at least a first direction (not shown). The first and/or second feed frame membrane support structures may be configured to change the flow of at least part of the mixed gas stream from the at least a first direction to at least a second direction (not shown) that is different from the first direction.

The first, second, and/or third feed frame support members may, for example, be in the form of at least one feed frame projection or finger 302 attached to the feed frame perimeter shell and/or formed with the feed frame perimeter shell. The feed frame projection(s) may extend from the perimeter shell in any suitable direction(s). For example, the feed frame projection(s) may extend from the feed frame perimeter shell in a direction that is generally perpendicular (and/or generally parallel) to the direction in which at least part of the mixed gas stream flows from the input conduit toward the feed frame open region. For example, if the flow of the mixed gas stream from the input conduit toward the feed frame open region is generally in a horizontal direction, the feed frame projection(s) may extend from the feed frame perimeter shell in generally a vertical direction and/or a horizontal direction.

Figure 15:
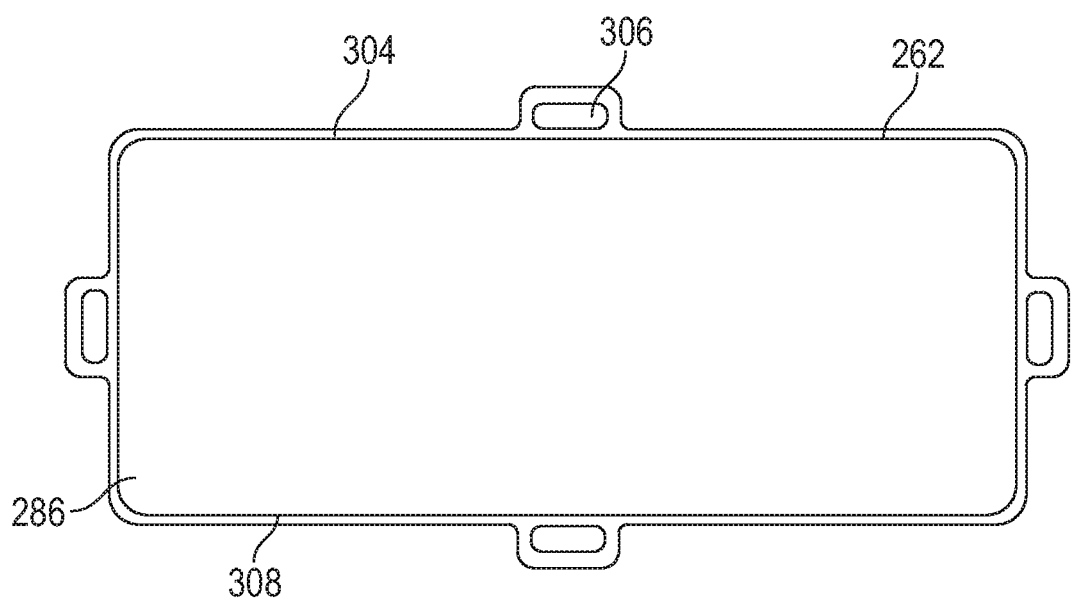
FIG. 15 is a top view of the hydrogen purification device of FIG. 4, showing an example of a perimeter shell of a perimeter shell of a permeate frame, and a membrane support structure of the permeate frame.

Permeate frame 262 may be positioned such that the at least one foil-microscreen assembly is disposed between one of the first and second end frames and the permeate frame or between two foil-microscreen assemblies. The permeate frame may include a permeate frame perimeter shell 304, a permeate frame output conduit 306, a permeate frame open region 308, and membrane support structure 286, as shown in FIG. 15.

The permeate frame perimeter shell may include any suitable structure. For example, the permeate frame perimeter shell may include a first section or first perimeter shell 310 and a second section or second perimeter shell 312, as shown in FIG. 14. The first and second sections may be first and second halves of the perimeter shell, or may be any suitable portions of that perimeter shell. Additionally, the first and/or second sections may include channels or grooves (not shown) in any suitable relationship with each other, such as offset from each other. First section 310 and second section 312 may be joined via any suitable method(s) to form a gas-tight seal between those sections. For example, a permeate frame gasket 314 may be used between those sections. The permeate frame gasket may be configured such that, when permeate frame 262 is secured to the first and second end frames, a thickness 316 of the permeate frame perimeter shell matches or substantially matches (identical to or substantially identical to) a thickness 318 of the membrane support structure, as shown in FIG. 14 and further discussed below.

Alternatively, the first and second sections may be brazed together or layering metal(s) may be used to join the first and second sections as described in U.S. Patent Application Publication No. 2013/0011301. The complete disclosure of which is hereby incorporated by reference for all purposes.

Figure 16:
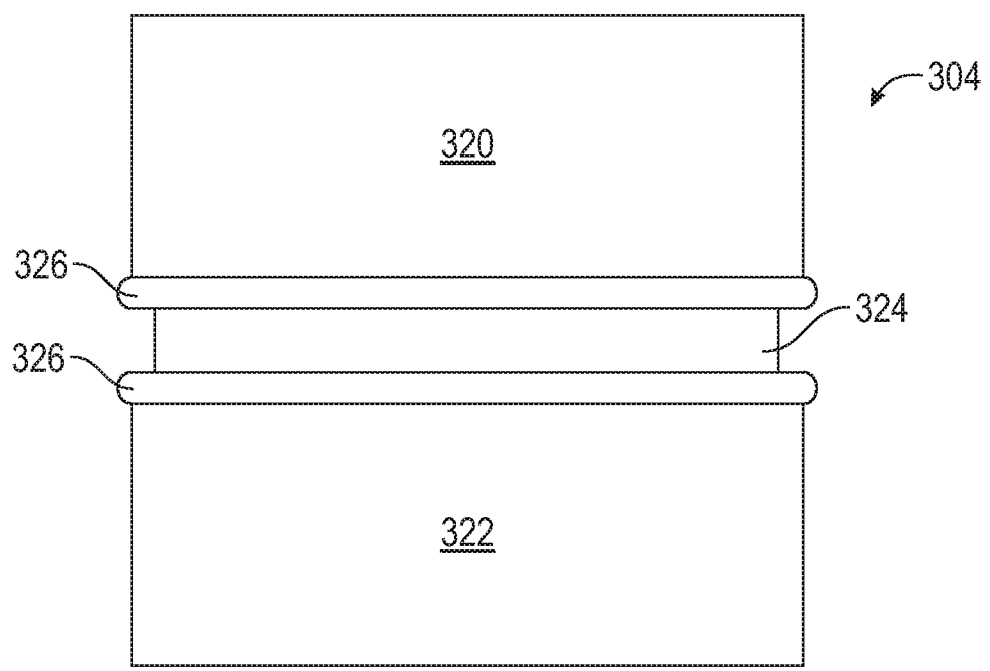
FIG. 16 is a partial sectional view of another example of a perimeter shell of a permeate frame of the hydrogen purification device of FIG. 4.

In some embodiments, permeate frame perimeter shell 304 may include a first section 320, a second section 322, and a third section 324 disposed between the first and second sections, as shown in FIG. 16. Those sections may be first, second, and third sections of the perimeter shell, or may be any suitable portions of that perimeter shell. Additionally, the first, second, and/or third sections may include channels or grooves (not shown) in any suitable relationship with each other, such as offset from each other. Please note that the components of FIG. 16 have been exaggerated for illustration purposes and may not reflect the relative dimensions of those components. First section 320, second section 322, and third section 324 may be joined via any suitable method(s) to form a gas-tight seal between those sections. For example, permeate frame gaskets 326 may be used between those sections. The permeate frame gaskets may be configured such that, when permeate frame 262 is secured to the first and second end frames, thickness 316 of the permeate frame perimeter shell matches or substantially matches (identical to or substantially identical to) thickness 318 of the membrane support structure, as shown in FIG. 14. Alternatively, the first, second, and/or third sections may be brazed together or layering metal(s) may be used to join the first, second, and/or third sections as described in U.S. Patent Application Publication No. 2013/0011301. The complete disclosure of which is hereby incorporated by reference for all purposes.

Output conduit 306 may be formed on permeate frame perimeter shell 282 and/or be configured to receive the permeate stream from membrane support structure 286, permeate frame open region 308, and/or the hydrogen-selective membrane(s). Perimeter shell 282 may include a plurality of grooves or channels (not shown) fluidly connecting output conduit 284 with the permeate frame open region and/or the membrane support structure. The channels may be formed on perimeter shell 282 via any suitable method(s) and/or may have any suitable orientation(s), such as angled orientations.

Membrane support structure 286 may include any suitable structure configured to support the at least one foil-microscreen assembly, such as the first, second, third, and/or other portions of the foil-microscreen assembly. In some embodiments, the membrane support structure may include first, second, and/or third support members (not shown) similar to one or more of the other frames. Alternatively, membrane support structure 288 may include one or more membrane support plates 328, as shown in FIG. 14. The membrane support plate(s) may span any suitable portion(s) of the open region, such as at least a substantial portion of the open region. Additionally, the membrane support plate(s) may be solid, flat or planar, free from perforations or holes (or without perforations or holes), free from bumps and/or protrusions (or without bumps and/or protrusions), and/or may be incompressible (or substantially incompressible). Moreover, the membrane support plate(s) may not be attached (or free from attachment) to the permeate frame perimeter shell. In other words, only the feed frames may lock the membrane support structure in place within the open region of the permeate frame perimeter shell when the feed frames are secured to the first and second end plates. Furthermore, the membrane support plate(s) may be made of any suitable material(s), such as stainless steel.

Figure 17:
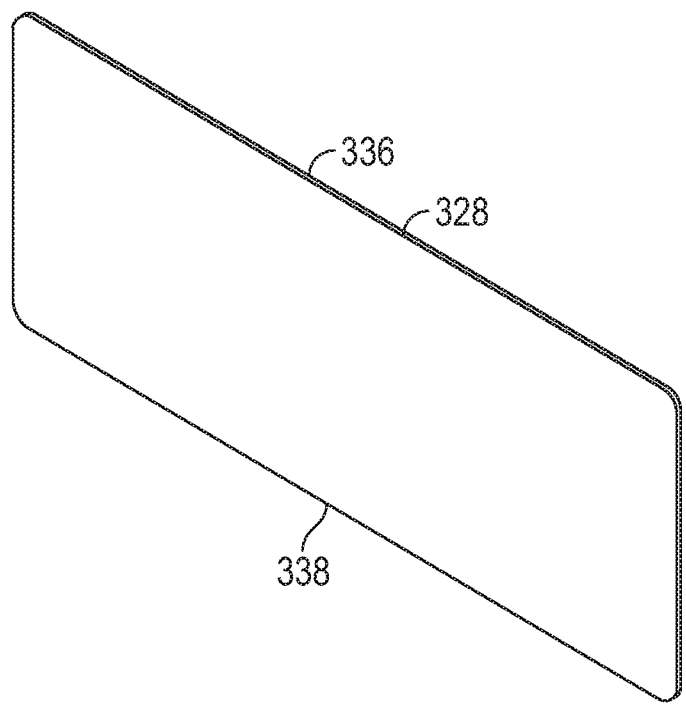
FIG. 17 is an isometric view of an example of membrane support plate of a membrane support structure of a permeate frame of the hydrogen purification device of FIG. 4.
Figure 18:
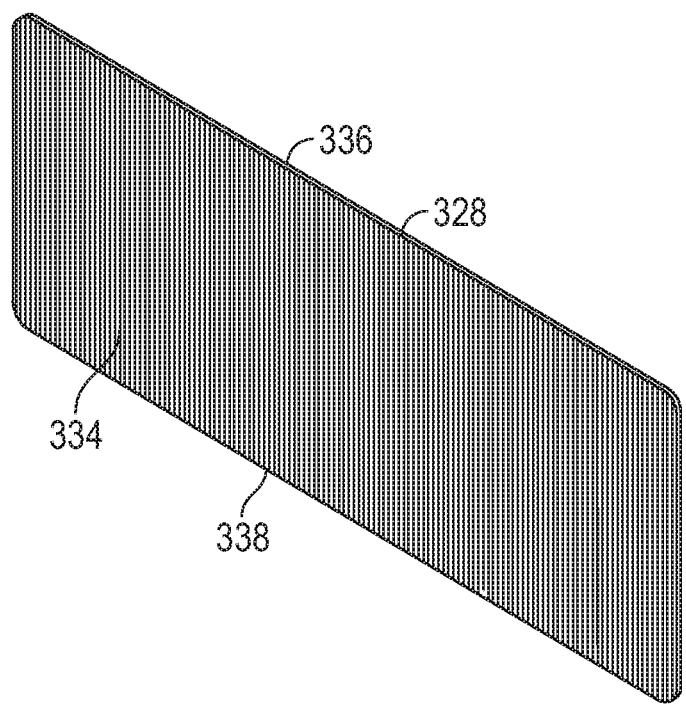
FIG. 18 is an isometric view of another example of a membrane support plate of a membrane support structure of a permeate frame of the hydrogen purification device of FIG. 4.

Membrane support plate(s) 328 may include a first face (or surface) 330 and a second opposed face (or opposed surface) 332, as shown in FIG. 14. Either or both faces of the membrane support plate(s) may exclude or be free from any or all grooves, bumps, protrusions, etc., as shown in FIG. 17. In some embodiments, either or both faces of the membrane support plate(s) 328 may include a plurality of microgrooves 334, as shown in FIG. 18, which may include any suitable structure that provides one or more flow paths for the permeate stream. When membrane support plate(s) 328 include surface microgrooves, those plates may be referred to as "surface-grooved plate(s)." The microgrooves may have any suitable orientation(s), such as parallel to each other. Additionally, microgrooves 334 may extend from a first edge 336 to a second opposed edge 338 of the membrane support plates, as shown in FIG. 18 (or a third edge to a fourth opposed edge). Alternatively, one or more of the microgrooves may extend from the first edge to prior to the second edge, from the second edge to prior to the first edge, between but not including the first and second edges, etc. Moreover, microgrooves 334 may be on only the first face, on only the second face, or on both the first and second faces. Furthermore, the microgrooves may be included along an entire length or width of the membrane support plates (as shown in FIG. 18) or may be along any suitable portion(s) of that length or width, such as 25%, 50%, or 75% of the length or width.

Microgrooves 334 may have any suitable dimensions. For example, the microgrooves may have a width between 0.005 inches to 0.020 inches (or preferably between 0.010 to 0.012 inches) and a depth between 0.003 to 0.020 inches (or preferably 0.008 to 0.012 inches). The microgrooves may be spaced at any suitable distance(s), such as 0.003 to 0.020 inches (or preferably 0.003 to 0.007 inches). The microgrooves may be manufactured by any suitable method(s), such as chemical etching, machining, and/or the like.

In some embodiments, membrane support structure 286 may include a single support plate 339 having opposing faces (with either or both faces having microgrooves 334), as shown in FIG. 14. Alternatively, membrane support structure may include a first membrane support plate 340 and a second membrane support plate 342, as shown in dashed lines in FIG. 14. The first membrane support plate may include a first face 344 and a second opposed face 346. Second membrane support plate 342 may include a first face 348 and a second opposed face 349. The first face of the first and/or second membrane support plates may include or exclude microgrooves 334. Additionally, the second face of the first and second membrane support plates may face toward each other. In other words, the first and second membrane support plates may be stacked in the membrane support structure such that the second face of the first membrane support plate faces the second face of the second membrane support plate, and/or vice-versa. In some embodiments, the second face of the first membrane support plate may contact the second face of the second membrane support plate.

Figure 19:
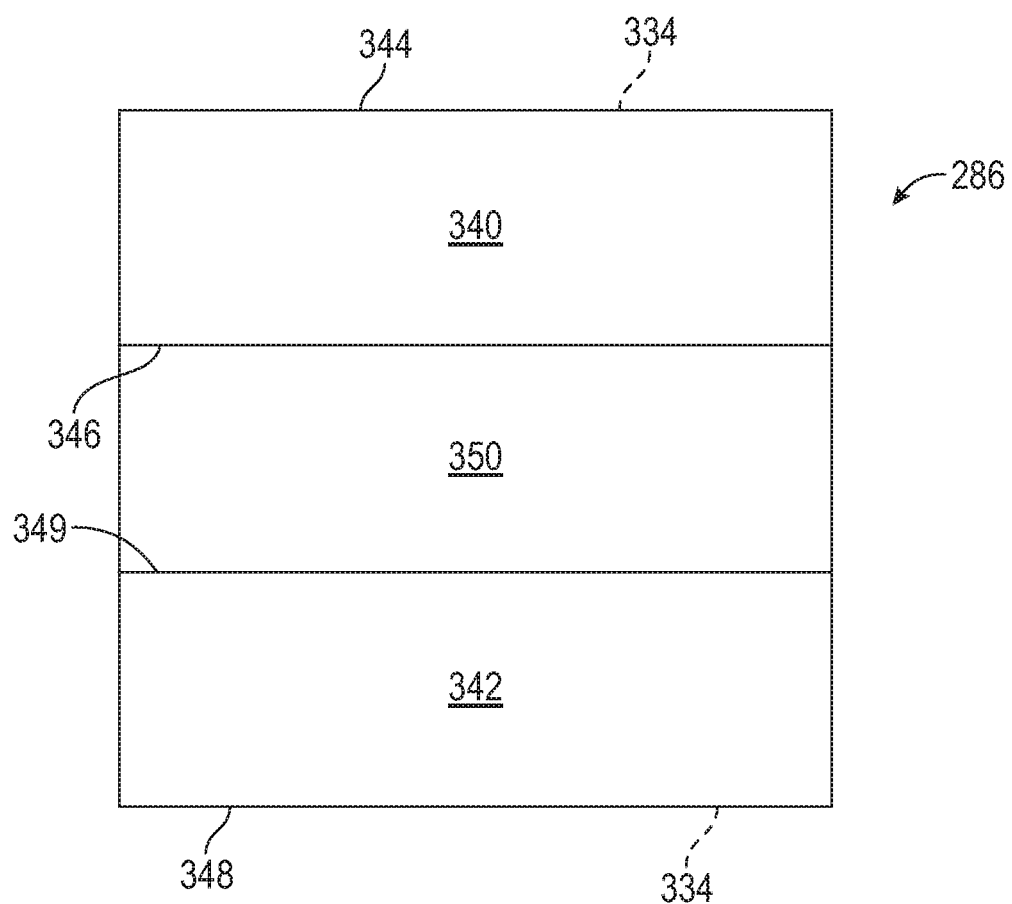
FIG. 19 is a sectional view of another example of a membrane support structure of the hydrogen purification device of FIG. 4.

In some embodiments, the membrane support structure may include a third membrane support plate 350, which may be disposed between the first and second membrane support plates as shown in FIG. 19. Please note that the components of FIG. 19 have been exaggerated for illustration purposes and may not reflect the relative dimensions of those components. Membrane support structure may include the first, second, and third membrane support plates stacked such that the third membrane support plate contacts the second faces of the first and/or second membrane support plates. When the third membrane support plate is disposed between the first and second membrane support plates, the third membrane support plate may sometimes be referred to as a "center plate." The third membrane support plate may be free from the microgrooves on either or both of its faces. The first, second, and third membrane support plates may have any suitable dimensions. For example, the first and second membrane support plates may be 0.060 inches, while the third membrane support plate may be 0.105 inches.

As discussed above, permeate frame gaskets 314 and/or 326 may be configured such that, when the permeate frame is secured and/or compressed to the first and second end frames, the thickness of the permeate frame matches the thickness of the membrane support structure. Those gaskets may yield a thickness before compression that is greater than the thickness of the membrane support structure. When flexible graphite gaskets are used for the permeate frame gasket(s) with compression limits of 15 to 50%, then the permeate frame gasket(s) may have a thickness before compression that results in a desired final thickness within those compression limits. When the permeate frame includes such gaskets, the permeate frame may sometimes be referred to as a "self-adjusting permeate frame." When the self-adjusting permeate frame is compressed during assembly by compression through the feed frames (such as under 1000 to 2000 psi compression) to form a gas-tight seal between the feed frame and the hydrogen-selective membrane, the compressive force of the feed frame against the permeate frame may be arrested when the feed frame contacts the hydrogen-selective membrane(s), the microscreen structure, and the membrane support structure, which together may form a generally incompressible group or stack of components.

As an example, if the membrane support structure has a thickness of 0.257 inches, then the permeate frame ideally would have a thickness that is exactly or about 0.257 inches. When the permeate frame perimeter shell includes two sections that are each, for example, 0.120 inches thick, then the permeate frame gasket should be configured to be 0.017 inches thick after compression. For example, a permeate frame gasket that is 0.030 inches thick before compression may be compressed within its compression limits to 0.017 inches after compression, which would produce a permeate frame thickness that matches the membrane support structure thickness. Although membrane support structure 286 is shown to include membrane support plates 328, the membrane support structure may include wire mesh and/or perforated metal sheet(s) (not shown).

Frames 224 also may include gaskets or gasket frames 264, as shown in FIG. 4. The gasket frames may include any suitable structure configured to provide fluid-tight interfaces among the other frames, such as between first and second end plates 200 and 202 and feed frames 260, between feed frames 260 and foil-microscreen assemblies 205, between the foil-microscreen assemblies and permeate frame 262. An example of a suitable gasket for gasket frames 264 is flexible graphite gaskets. Another example of a suitable gasket material is THERMICULITE® 866 sold by Flexitallic LP (Deer Park, Tex.). Although frames 224 are shown to include two feed frames 260 and a single permeate frame 262, the frames may include any suitable number of feed frames and permeate frames. Additionally, although hydrogen purification device 196 is shown to include two hydrogen-selective membranes 206, the device may include any suitable number of those membranes.

Although one or more of frames 224 are shown to include projections that extend only in the vertical direction or only in the horizontal direction, the frames may additionally, or alternatively, include projections that extend in the horizontal, vertical, and/or other suitable directions, such as diagonal, etc. Additionally, although one or more frames 224 are shown to include three projections, the frames may include one, two, four, five, or more projections. Moreover, although one or more frames 224 are shown to include projections that are co-planar within the first, second, and/or third support planes, the frames may additionally, or alternatively, include projections that are co-planar within fourth, fifth or more support planes.

Figure 20:
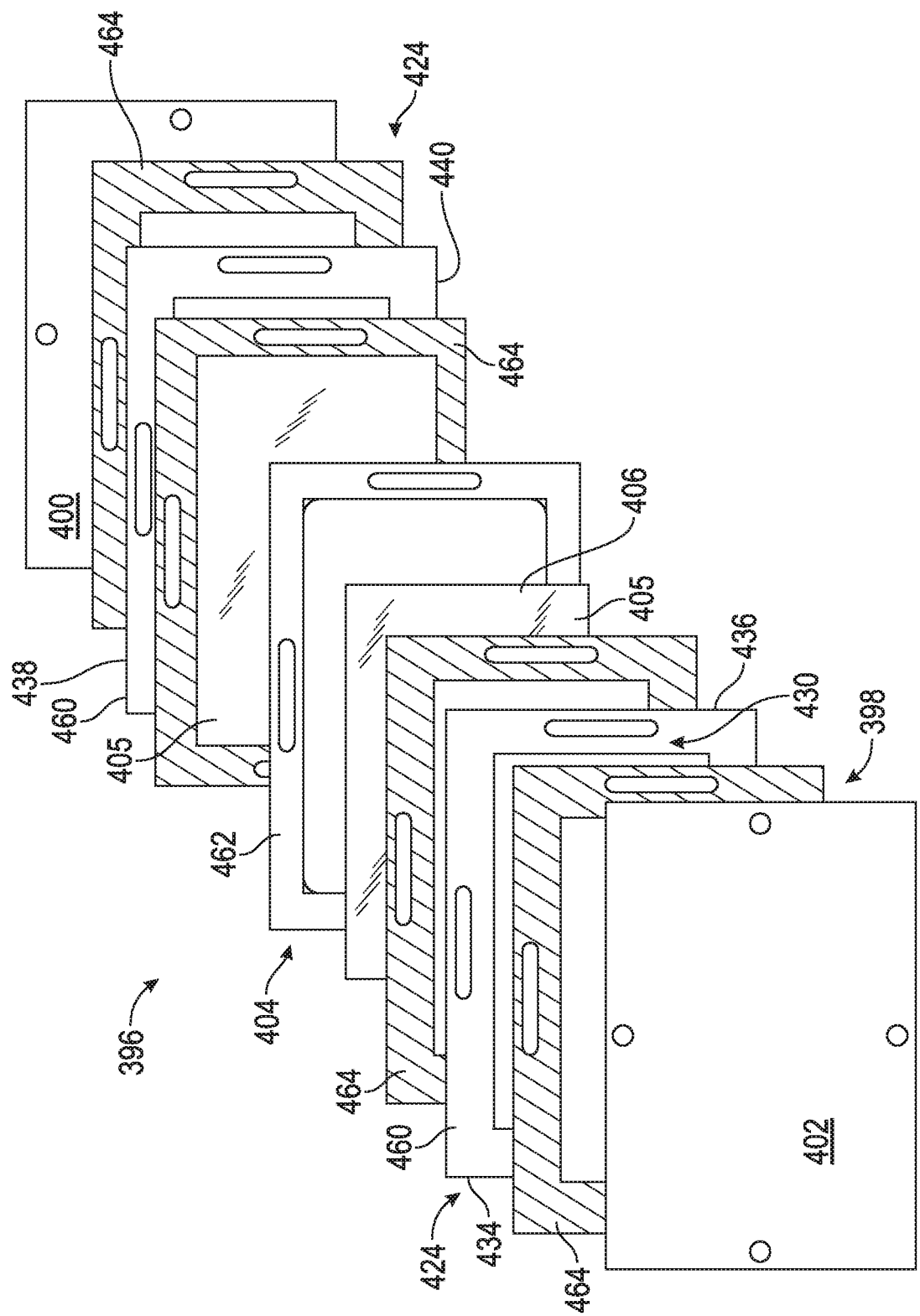
FIG. 20 is an exploded isometric view of another example of the hydrogen purification device of FIG. 3.

Another example of hydrogen purification device 144 is generally indicated at 396 in FIG. 20. Unless specifically excluded, hydrogen purification device 396 may include one or more components of other hydrogen purification devices and/or purification regions described in this disclosure.

Hydrogen purification device 396 is similar in many respects to hydrogen purification device 196 but with different-shaped frames, no support members, different-sized foil-microscreen assemblies, and less gasket frames, as further described below. Components or parts of hydrogen purification device 396 correspond to components or parts of hydrogen purification device 196, and are labeled with similar reference numbers in FIG. 20 having the general form "3XX" rather than "1XX" and "4XX" rather than "2XX." Accordingly, features 398, 400, 402, 404, 405, 406, 408, 424, 426, 434, 436, 438, 440, 460, 462, 464, etc. may be identical or substantially identical to their respective counterparts in hydrogen purification device 196, namely features 198, 200, 202, 204, 205, 206, 208, 224, 226, 234, 236, 238, 240, 260, 262, 264, etc.

Hydrogen purification device 396 may include a shell or enclosure 398, which may include a first end plate or end frame 400 and a second end plate or end frame 402. The first and second end plates may be configured to be secured and/or compressed together to define a sealed pressure vessel having an interior compartment 404 in which the hydrogen-separation region is supported.

Hydrogen purification device 396 also may include at least one foil-microscreen assembly 405, which may be disposed between and/or secured to the first and second end plates. The foil-microscreen assembly may include at least one hydrogen-selective membrane 406 and at least one microscreen structure 408. One or more of the hydrogen-selective membranes may be metallurgically bonded to microscreen structure 408. For example, one or more of hydrogen-selective membranes 406 may be diffusion bonded to the microscreen structure to form a solid-state diffusion bond between the membrane(s) and the microscreen structure. Foil-microscreen assembly 405 is sized to fit the open region of the permeate frame and is thus smaller in length and width as compared or relative to foil-microscreen assembly 205.

Hydrogen purification device 396 also may include a plurality of plates or frames 424 disposed between and secured to the first and/or second end frames. Frames 424 may include a perimeter shell 426. The perimeter shell may define an open region 430. Additionally, perimeter shell 426 may include first and second opposed sides 434 and 436, and third and fourth opposed sides 438 and 440. Unlike frames 224 of hydrogen purification device 196, frames 424 do not include any support members.

Frames 424 may include at least one feed frame 460, at least one permeate frame 462, and a plurality of gaskets or gasket frames 464. Feed frame 460 may be disposed between one of the first and second end frames and at least one foil-microscreen assembly 405, or between two foil-microscreen assemblies 405. The feed frame may include at least substantially similar components as feed frame 260, such as a feed frame perimeter shell, a feed frame input conduit, a feed frame output conduit, and/or a feed frame open region.

Permeate frame 462 may be positioned such that the at least one foil-microscreen assembly is disposed between one of the first and second end frames and the permeate frame or between two foil-microscreen assemblies. The permeate frame may include at least substantially similar components as permeate frame 262, such as a permeate frame perimeter shell, a permeate frame output conduit, a permeate frame open region, and/or a membrane support structure.

Frames 424 also may include gaskets or gasket frames 464. The gasket frames may include any suitable structure configured to provide fluid-tight interfaces among the other frames, such as between first and second end plates 400 and 402 and feed frames 460, and/or between feed frames 460 and foil-microscreen assemblies 405. Unlike hydrogen purification device 196, hydrogen purification device 396 does not include gasket frames 464 between the foil-microscreen assemblies and permeate frame 462. Similar to hydrogen purification device 196, the widths of the feed frame and the gasket frames are larger than the widths of the permeate frame (or the open region of the feed frame and the gasket frames is smaller than the open region of the permeate frame) such that the extra width covers the edge of the foil-microscreen assemblies to eliminate or minimize leak from the feed side to the permeate side or from the permeate side to the feed side (see, e.g., FIG. 14 that shows how the extra width of the feed frames and gasket frames covers the edge of the foil-microscreen assemblies). In some embodiments, the extra width corresponds to the width of the perimeter (non-perforated) portion of the microscreen structure of the foil-microscreen assemblies.

Hydrogen purification devices and/or their components (e.g., foil-microscreen assemblies) of the present disclosure may include one or more of the following:

- First and second end frames including an input port configured to receive a mixed gas stream containing hydrogen gas and other gases.
- First and second end frames including an output port configured to receive a permeate stream containing at least one of a greater concentration of hydrogen gas and a lower concentration of other gases than a mixed gas stream.
- First and second end frames including a byproduct port configured to receive a byproduct stream containing at least a substantial portion of other gases.
- At least one foil-microscreen assembly disposed between and secured to the first and second end frames.
- At least one hydrogen-selective membrane disposed between and secured to first and second end frames.
- At least one hydrogen-selective membrane having a feed side and a permeate side, at least part of a permeate stream being formed from a portion of a mixed gas stream that passes from the feed side to the permeate side, with the remaining portion of a mixed gas stream, which remains on the feed side, forming at least part of a byproduct stream.
- At least one hydrogen-selective membrane metallurgically bonded to the at least one microscreen structure.
- A permeate side of the at least one hydrogen-selective membrane metallurgically bonded to the at least one microscreen structure.
- At least one hydrogen-selective membrane diffusion bonded to the at least one microscreen structure.
- A permeate side of the at least one hydrogen-selective membrane diffusion bonded to the at least one microscreen structure.

At least one microscreen structure disposed between at least one hydrogen-selective membrane and at least one permeate frame.
At least one microscreen structure configured to support at least one hydrogen-selective membrane.
At least one microscreen structure includes generally opposed surfaces configured to provide support to a permeate side.
At least one microscreen structure includes a plurality of fluid passages extending between opposed surfaces.
At least one microscreen structure being sized not to contact a perimeter shell of at least one permeate frame.
At least one microscreen structure being sized not to contact a perimeter shell when at least one microscreen structure and at least one permeate frame are secured to first and second end frames.
At least one microscreen structure including a non-porous planar sheet having a plurality of apertures forming a plurality of fluid passages.
A non-porous planar sheet including generally opposed planar surfaces configured to provide support to a permeate side.
A non-porous planar sheet including at least a perimeter portion that is free from apertures.
A non-porous planar sheet including two or more discrete portions having apertures.
At least one microscreen structure including a non-porous metal sheet having a plurality of apertures forming the plurality of fluid passages.
A non-porous metal sheet defining a plane, wherein apertures of the non-porous sheet include an axis that is perpendicular to the plane.
Apertures of the non-porous sheet are circular.
Apertures of the non-porous sheet are elongated circles.
Apertures of the non-porous sheet are ovals.
Apertures of the non-porous sheet are hexagons.
A non-porous metal sheet including stainless steel.
A non-porous metal sheet including 300-series stainless steel.
A non-porous metal sheet including 400-series stainless steel.
A non-porous metal sheet including stainless steel having about 0.6 weight % to about 3.0 weight % of aluminum.
A non-porous metal sheet including one or more nickel alloys.
A non-porous metal sheet including one or more nickel alloys with a plated nickel surface.
A non-porous metal sheet including one or more nickel alloys having copper.
One or more discrete portions spaced from adjacent discrete portions by at least one border portion that is free from apertures.
A different hydrogen-selective membrane is metallurgically bonded to a discrete portion.
A hydrogen-selective membrane is sized larger than a discrete portion such that a perimeter portion of the hydrogen-selective membrane contacts one or more portions of the non-porous planar sheet that does not include apertures.
A plurality of frames disposed between first and second end frames and at least one hydrogen-selective membrane and secured to the first and second end frame.
A plurality of frames including at least one permeate frame disposed between at least one hydrogen-selective membrane and a second end frame.
At least one permeate frame including a perimeter shell.
At least one permeate frame including an output conduit formed on a perimeter shell and configured to receive at least part of a permeate stream from at least one hydrogen-selective membrane.
At least one permeate frame including an open region surrounded by a perimeter shell.
At least one permeate frame including at least one membrane support structure.
At least one membrane support structure spanning at least a substantial portion of an open region.
At least one membrane support structure that is configured to support at least one hydrogen-selective membrane.
At least one membrane support structure including a single membrane support plate that includes a first face and a second face opposed to the first face.
The first and/or second faces have a plurality of microgrooves configured to provide flow channels for at least part of the permeate stream.
The first and/or second faces are free from microgrooves.
At least one membrane support structure including first and second membrane support plates.
First and second membrane support plates are free from perforations.
First and second membrane support plates having a first face having a plurality of microgrooves configured to provide flow channels for at least part of a permeate stream.
First and second membrane support plates having a second face opposed to a first face.
First and second membrane support plates stacked in at least one membrane support structure.
First and second membrane support plates stacked in at least one membrane support structure such that a second face of the first membrane support plate faces a second face of the second membrane support plate.
Noncom pressible first and second membrane support plates.
Flat first and second membrane support plates.
At least one feed frame disposed between a first end frame and at least one hydrogen-selective membrane.
At least one feed frame including a perimeter shell.
At least one feed frame including an input conduit formed on a perimeter shell of the at least one feed frame.
At least one feed frame including an input conduit configured to receive at least part of a mixed gas stream from the input port.
At least one feed frame including an output conduit formed on a perimeter shell of the at least one feed frame.
At least one feed frame including an output conduit configured to receive the remaining portion of at least part of a mixed gas stream that remains on a feed side of at least one hydrogen-selective membrane.
At least one feed frame including a feed frame open region surrounded by a perimeter shell of a feed frame and disposed between input and output conduits.
A perimeter shell of at least one feed frame being sized such that the perimeter shell of the at least one feed frame supports a perimeter shell of at least one permeate frame and a portion of at least one membrane support structure.
A perimeter shell of at least one feed frame being sized such that the perimeter shell of the at least one feed frame supports a perimeter shell of at least one permeate frame and a portion of at least one membrane support structure along a plurality of support planes that are perpendicular to the frame plane of each frame of a plurality of frames.

At least one membrane support structure including a third membrane support plate.

A third membrane support plate disposed between first and second membrane support plates.

A non-compressible third membrane support plate.

A flat third membrane support plate.

A third membrane support plate free from perforations.

A third membrane support plate free from microgrooves.

A perimeter shell of a permeate frame including first and second perimeter shells.

A perimeter shell of a permeate frame including a gasket disposed between first and second perimeter shells.

A gasket configured such that the thickness of a permeate frame perimeter shell matches the thickness of a membrane support structure.

A gasket configured such that, when a permeate frame is secured to first and second end frames, the thickness of a permeate frame perimeter shell matches the thickness of a membrane support structure.

A permeate frame perimeter shell including first, second, and third perimeter shells.

A permeate frame perimeter shell including a first gasket disposed between first and second perimeter shells.

A permeate frame perimeter shell including a second gasket disposed between second and third perimeter shells.

First and second gaskets configured such that the thickness of a permeate frame perimeter shell matches the thickness of a membrane support structure.

First and second gaskets configured such that, when a permeate frame is secured to first and second end frames, the thickness of the permeate frame perimeter shell matches the thickness of a membrane support structure.

First and second membrane support plates each having first and second opposed edges.

A plurality of microgrooves that extend from a first edge to a second edge.

A plurality of parallel microgrooves.

INDUSTRIAL APPLICABILITY

The present disclosure, including hydrogen purification devices and components of those devices, is applicable to the fuel-processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A foil-microscreen assembly, comprising:
   two or more hydrogen-selective membranes each having a feed side and a permeate side, wherein each of the two or more hydrogen-selective membranes is configured to receive a mixed gas stream, to form a permeate stream from the portion of the mixed gas stream that passes from the feed side to the permeate side, and to form a byproduct stream from the remaining portion of the mixed gas stream that remains on the feed side; and
   at least one microscreen structure including a non-porous planar sheet having a plurality of apertures forming a plurality of fluid passages, the planar sheet includes generally opposed planar surfaces configured to provide support to the permeate side of each of the two or more hydrogen-selective membranes, the plurality of fluid passages extending between the opposed surfaces, wherein the permeate side of each of the two or more hydrogen-selective membranes is metallurgically bonded to the at least one microscreen structure, wherein:
   the plurality of apertures is disposed on the non-porous planar sheet such that at least a perimeter portion of the planar sheet is free from the plurality of apertures,
   the non-porous planar sheet includes two or more discrete portions having the plurality of apertures,
   each discrete portion of the two or more discrete portions is spaced from adjacent discrete portions of the two or more discrete portions by at least one border portion that is free from the plurality of apertures, and
   a different hydrogen-selective membrane of the two or more hydrogen-selective membranes is metallurgically bonded to each discrete portion of the two or more discrete portions, and
   each hydrogen-selective membrane of the two or more hydrogen-selective membranes is sized larger than the corresponding discrete portion such that a perimeter portion of the hydrogen-selective membrane contacts one or more portions of the non-porous planar sheet that do not include the plurality of apertures.

2. The assembly of claim 1, wherein the at least one hydrogen-selective membrane is diffusion bonded to the at least one microscreen structure.

3. The assembly of claim 1, where the non-porous planar sheet defines a plane, wherein the each of the plurality of apertures includes an axis that is perpendicular to the plane.

4. The assembly of claim 1, wherein one or more apertures of the plurality of apertures are ovals.

5. The assembly device of claim 4, wherein all apertures of the plurality of apertures are ovals.

6. The assembly device of claim 1, wherein one or more apertures of the plurality of apertures are elongated circles.

7. The assembly of claim 6, wherein all apertures of the plurality of apertures are elongated circles.

8. The assembly device of claim 1, wherein one or more apertures of the plurality of apertures are hexagons.

9. The assembly of claim 1, wherein all apertures of the plurality of apertures are hexagons.

10. The assembly of claim 1, wherein the non-porous planar sheet includes stainless steel.

11. The assembly device of claim 1, wherein the non-porous planar sheet includes one or more nickel alloys.

12. The assembly of claim 1, wherein the two or more hydrogen-selective membranes are made of one or more palladium alloys.

13. The assembly of claim 12, wherein the one or more palladium alloys include 35 weight % to 45 weight % of copper.

14. The assembly of claim 12, wherein the one or more palladium alloys include 20 weight % to 30 weight % of silver.

15. The assembly of claim 1, wherein the at least one microscreen structure is coated with a thin metal layer.

16. The assembly of claim 1, wherein the thin metal layer is made of one of silver, copper, or nickel.

* * * * *

UNITED STATES PATENT AND TRADEMARK OFFICE
CERTIFICATE OF CORRECTION

PATENT NO. : 11,103,828 B2
APPLICATION NO. : 16/904872
DATED : August 31, 2021
INVENTOR(S) : David J. Edlund et al.

It is certified that error appears in the above-identified patent and that said Letters Patent is hereby corrected as shown below:

In the Claims

At Column 30, Lines 46 and 47 (Claim 2): Replace "the at least one hydrogen-selective membrane" with --each of the two or more hydrogen-selective membranes--.

Signed and Sealed this
Twenty-fifth Day of October, 2022

Katherine Kelly Vidal
*Director of the United States Patent and Trademark Office*